US011302961B1

(12) United States Patent
Song et al.

(10) Patent No.: US 11,302,961 B1
(45) Date of Patent: Apr. 12, 2022

(54) SEMI-SOLID POLYMER ELECTROLYTE AND USES THEREOF IN ELECTROCHEMICAL DEVICES

(71) Applicant: Storagenergy Technologies, Inc., Salt Lake City, UT (US)

(72) Inventors: Junhua Song, Salt Lake City, UT (US); Feng Zhao, Salt Lake City, UT (US); Jinyun Liao, Salt Lake City, UT (US); Rui Zhang, Salt Lake City, UT (US); Joel Kirner, Salt Lake City, UT (US)

(73) Assignee: Storagenergy Technologies, Inc., Salt Lake City, UT (US)

( * ) Notice: Subject to any disclaimer, the term of this patent is extended or adjusted under 35 U.S.C. 154(b) by 0 days.

(21) Appl. No.: 17/364,422

(22) Filed: Jun. 30, 2021

(51) Int. Cl.
*H01M 10/0525* (2010.01)
*H01M 10/0569* (2010.01)
*H01M 10/0565* (2010.01)

(52) U.S. Cl.
CPC ... *H01M 10/0565* (2013.01); *H01M 10/0525* (2013.01); *H01M 10/0569* (2013.01);
(Continued)

(58) Field of Classification Search
CPC ......... H01M 10/0565; H01M 10/0525; H01M 10/0569; H01M 2300/0082; H01M 2300/0091
See application file for complete search history.

(56) References Cited

U.S. PATENT DOCUMENTS 7,135,254 B2   11/2006  Yun et al.
8,052,888 B2   11/2011  Yoshino et al.
(Continued)

FOREIGN PATENT DOCUMENTS

CA   2382118 A1   3/2001
EP   0379372 B1   10/1993
(Continued)

OTHER PUBLICATIONS

Vivian Murray et al., "A Guide to Full Coin Cell Making for Academic Researchers," Journal of The Electrochemical Society, vol. 166, No. 2, 2019, pp. A329-A333.
(Continued)

*Primary Examiner* — Osei K Amponsah
(74) *Attorney, Agent, or Firm* — Siepmann IP, PLLC

(57) ABSTRACT

Described herein are semi-solid polymer electrolytes (SSPEs) based on a polymer backbone incorporating a flame-retardant crosslinker and fluorinated counterions that are useful in the production of high energy rechargeable lithium metal batteries. The described SSPEs are not liquid electrolytes, are not solid state electrolytes (SSEs), and are differentiated from standard state-of-the-art gel polymer electrolytes (GPEs). The described SSPEs are formed from a first solvent, an optional second solvent, a crosslinker, a lithium salt, and an initiator. The unique coordination structure of the described SSPEs yields non-flammable, low-volatility, non-vaporizable, high Coulombic efficiency (CE), stable solid-electrolyte-interphase (SEI)-forming electrochemical devices, such as lithium metal rechargeable batteries, that are easily adaptable to existing mass-production lines.

21 Claims, 17 Drawing Sheets

(52) U.S. Cl.
CPC .............. *H01M 2300/0082* (2013.01); *H01M 2300/0091* (2013.01)

(56) References Cited

U.S. PATENT DOCUMENTS

| | | | |
|---|---|---|---|
| 8,137,849 | B2 | 3/2012 | Kang et al. |
| 8,492,033 | B2 | 7/2013 | Amine et al. |
| 9,748,604 | B2 | 8/2017 | Desimone et al. |
| 9,755,268 | B2 | 9/2017 | Fleischmann et al. |
| 9,819,053 | B1 | 11/2017 | Zimmerman |
| 10,033,049 | B2 | 7/2018 | Matsui et al. |
| 10,246,343 | B2 | 4/2019 | Chow et al. |
| 10,308,523 | B1 | 6/2019 | Chow et al. |
| 10,511,004 | B2 | 12/2019 | Kusachi et al. |
| 2007/0141461 | A1* | 6/2007 | Lin .......................... C08J 5/20 429/189 |
| 2008/0076026 | A1* | 3/2008 | Ryu .................. H01M 10/0565 429/189 |
| 2010/0119950 | A1 | 5/2010 | Hwang et al. |
| 2012/0244427 | A1* | 9/2012 | Hashimoto ............. C08F 16/14 429/200 |
| 2013/0236764 | A1 | 9/2013 | Hu et al. |
| 2015/0364773 | A1* | 12/2015 | Tamirisa ................ A61N 1/378 429/163 |
| 2016/0248122 | A1 | 8/2016 | Hwang et al. |
| 2016/0372743 | A1 | 12/2016 | Cho et al. |
| 2019/0237803 | A1 | 8/2019 | Gerasopoulos et al. |
| 2021/0257659 | A1 | 8/2021 | Park et al. |

FOREIGN PATENT DOCUMENTS

| | | |
|---|---|---|
| WO | 01/93363 A2 | 12/2001 |
| WO | 2004036599 A1 | 4/2004 |
| WO | 2016/130484 A1 | 8/2016 |
| WO | 2017/214276 A1 | 12/2017 |

OTHER PUBLICATIONS

Xiulin Fan et al., "All-temperature batteries enabled by fluorinated electrolytes with non-polar solvents," Nature Energy, vol. 4, Oct. 2019, pp. 882-890.
Carla Vilela et al., "Poly(bis[2-(methacryloyloxy)ethyl] phosphate)/Bacterial Cellulose Nanocomposites: Preparation, Characterization and Application as Polymer Electrolyte Membranes," Applied Sciences, vol. 8, No. 1145, 2018, pp. 1-15.
Xunliang Cheng et al., "Gel Polymer Electrolytes for Electrochemical Energy Storage," Advanced Energy Materials, vol. 1702184, 2017, pp. 1-16.
Chen Wang et al., "High polymerization conversion and stable high voltage chemistry underpinning an in-situ formed solid electrolyte," Chemistry of Materials, 2020, vol. 32, No. 21, pp. 9167-9175.
Shuru Chen et al., "High-Efficiency Lithium Metal Batteries with Fire-Retardant Electrolytes," Joule, vol. 2, Aug. 2018, pp. 1-12.
Shuru Chen et al., "High-Voltage Lithium-Metal Batteries Enabled by Localized High-Concentration Electrolytes," Advanced Materials, vol. 30, No. 1706102, 2018, pp. 1-7.
Michael J. Lain et al., "Design Strategies for High Power vs. High Energy Lithium Ion Cells," Batteries, vol. 5, No. 64, 2019, pp. 1-11.
Xiaodi Ren et al., "Localized High-Concentration Sulfone Electrolytes for High-Efficiency Lithium-Metal Batteries," Chem, vol. 4, Aug. 2018, pp. 1-16.
Thomas Marks et al., "A Guide to Li-Ion Coin-Cell Electrode Making for Academic Researchers," Journal of The Electrochemical Society, vol. 158, No. 1, 2011, pp. A51-A57.

Zhaohui Li et al., "Micro-porous P(VDF-HFP)-based polymer electrolyte filled with Al2O3 nanoparticles," Solid State Ionics, vol. 176, 2005, pp. 1903-1908.
Sanjuna Stalin et al., "Multifunctional Cross-Linked Polymeric Membranes for Safe, High-Performance Lithium Batteries," Chemistry of Materials, vol. 30, 2018, pp. 2058-2066.
Ismail Anil et al., "Design of Crosslinked Hydrogels Comprising Poly(Vinylphosphonic Acid) and Bis[2 (Methacryloyloxy)Ethyl] Phosphate as an Efficient Adsorbent for Wastewater Dye Removal," Nanomaterials, vol. 10, No. 131, 2020, pp. 1-23.
P. Hovington et al., "New Lithium Metal Polymer Solid State Battery for an Ultrahigh Energy: Nano C—LiFePO4 versus Nano Li1.2V3O8," Nano Letters, vol. 15, 2015, pp. 2671-2678.
Ziqi Zeng et al., "Non-flammable electrolytes with high salt-to-solvent ratios for Li-ion and Li-metal batteries," Nature Energy, vol. 3, Aug. 2018, pp. 674-681.
Christian Hans Krause et al., "Quasi-solid single ion conducting polymer electrolyte membrane containing novel fluorinated poly(arylene ether sulfonimide) for lithium metal batteries," Journal of Power Sources, vol. 484, No. 229267, 2021, pp. 1-11.
Hua Wang et al., "Alkali Metal Anodes for Rechargeable Batteries," Chem, vol. 5, Feb. 2019, pp. 313-338.
Junhua Song et al., "Crossroads in the renaissance of rechargeable aqueous zinc batteries," Materials Today, 2021, vol. 45, pp. 191-212.
S.L. Li et al., "A poly(3-decyl thiophene)-modified separator with self-actuating overcharge protection mechanism for LiFePO4-based lithium ion battery," Journal of Power Sources, vol. 196, 2011, pp. 7021-7024.
Weixiao Ji et al., "Temperature-responsive microspheres-coated separator for thermal shutdown protection of lithium ion batteries," RSC Advances, vol. 5, 2015, pp. 172-176.
Zonghai Chen et al., "Role of surface coating on cathode materials for lithium-ion batteries," Journal of Materials Chemistry, vol. 20, 2010, pp. 7606-7612.
M.Q. Xu et al., "Application of cyclohexyl benzene as electrolyte additive for overcharge protection of lithium ion battery," Journal of Power Sources, vol. 184, 2008, pp. 427-431.
Lu Zhang et al., "Novel redox shuttle additive for high-voltage cathode materials," Energy & Environmental Sciences, vol. 4, 2011, pp. 2858-2862.
Jianhui Wang et al., "Fire-extinguishing organic electrolytes for safe batteries," Nature Energy, vol. 3, Jan. 2018, pp. 22-29.
Ziqi Zeng et al., "Safer lithium ion batteries based on nonflammable electrolyte," Journal of Power Sources, vol. 279, 2015, pp. 6-12.
John Christopher Bachman et al., "Inorganic Solid-State Electrolytes for Lithium Batteries: Mechanisms and Properties Governing Ion Conduction," Chemical Reviews, vol. 116, 2016, pp. 140-162.
Weili Li et al., "Study the effect of ion-complex on the properties of composite gel polymer electrolyte based on Electrospun PVdF nanofibrous membrane," Electrochimica Acta, vol. 151, 2015, pp. 289-296.
Robert V. Morford et al., "A fire-resistant organophosphorus gel polymer electrolyte additive for use in rechargeable lithium batteries," Solid State Ionics, vol. 133, 2000, pp. 171-177.
Andreas J. Butzelaar et al., "A Systematic Study of Vinyl Ether-Based Poly(Ethylene Oxide) Side-Chain Polymer Electrolytes," ACS Applied Polymer Materials, vol. 3, 2021, pp. 1573-1582.
Burcu Oktay et al., "Preparation of poly(bis[2-(methacryloyloxy)ethyl] phosphate) crosslinked polymer brushes on Poly(vinylidene fluoride) nanofibers," Materials Chemistry and Physics, vol. 217, 2018, pp. 168-174.
Seung Sik Hwang et al., "Room temperature cross-linkable gel polymer electrolytes for lithium ion batteries by in situ cationic polymerization of divinyl ether," Electrochemistry Communications, vol. 12, 2010, pp. 916-919.

* cited by examiner

SEMI-SOLID POLYMER ELECTROLYTE AND USES THEREOF IN ELECTROCHEMICAL DEVICES

BACKGROUND

Lithium ion battery technology was first developed over thirty years ago. Lithium metal batteries is a variant of lithium ion battery (LIB) and belong to the class of alkali metal batteries for use in rechargeable batteries. Such alkali metals have been investigated for their potential in "next-generation" batteries due to their perceived high theoretical capacities and low electrochemical potentials. (See, Liu et al., *ACS Materials Lett.*, 1(2):217-229, 2019, and Wang et al., *Chem*, 5:313-338, 2019).

The commercial demand for high power and high energy density LIBs is high due to the accelerated adoption of electrified transportation, portable electronics, and renewable energy integration. As the energy and power densities of Li-ion/-metal batteries increases, however, safety becomes a major concern for commercialization of large-scale applications, such as electric vehicles and grid-scale energy storage. Li-metal batteries (LMBs) generally include negative and positive electrodes, with the negative electrode being comprised of lithium metal, and an electrolyte through which ions move from one electrode to another. One of the major safety concerns of LMBs comes from the flammable organic electrolyte vapor that escapes from failed cells within such batteries and the heat released from internal and localized shorts.

The combustible nature and low heat capacity of liquid aprotic solvents commonly used as electrolytes in such LMBs requires little energy input to move them to their ignitable gas phase. Such gasified electrolytes are susceptible to combustion after mixing with oxygen from ambient air, which can then lead to chain reactions with adjacent cells in an uncontrollable manner. (Song et al., *Materials Today*, ISSN 1369-7021, 2021).

Present day solutions aimed at preventing battery cell fire hazards involve the use of voltage- or temperature-sensitive separators, application of various surface protections or coatings on electrode materials, and inclusion of overcharge and redox-shuttle electrolyte additives. (See, Li et al. *J. Power Sources*, 196:7021-7024, 2011; Ji et al., *RSC Advances*, 5:172-176, 2015; Chen et al., *J. Mat. Chem.*, 20:7606-7612, 2010; Xu et al., *J. Power Sources*, 184:427-431, 2008; Zhang et al., *Energy Environ. Sci.*, 4:2858-2861, 2011). These solutions can in some instances reduce the risk of thermal chain reactions upon leakage of the electrolyte, but do not completely eradicate the risk of fire as long as flammable organic electrolytes are still present in liquid or gel electrolytes.

Efforts to replace flammable electrolytes have also been pursued but with little commercial success. For example, liquid organic phosphates, including trimethyl phosphate, tri-ethyl phosphate, and diethyl ethylphosphonate, have been used as electrolyte solvents to absorb hydrogen radicals that cause the combustion chain reactions. (See, Wang et al., *Nat. Energy*, 3:22-29, 2018; and Zeng et al., *J. Power Sources*, 279:6-12, 2015). However, such phosphates do not form a stable solid-electrolyte-interphase (SEI) on the electrode materials, and thus adversely impact cell performance in terms of the window of electrochemical stability and cycle life. Additional electrolyte additives are required for phosphate-based electrolytes to compensate the SEI film-forming, which complicates electrolyte formulation and hence increases production costs. In addition, the liquid nature of phosphate-based electrolytes makes such batteries inevitably prone to leakage and corrosion if the structural integrity of battery is compromised.

Batteries based on solid-state electrolytes (SSE) have also been proposed as a safer alternative to organic liquid electrolytes. Despite being chemically more stable at elevated temperature, the state-of-the-art SSEs, including polymers, oxides, and sulfides, have lower ionic conductivities than liquid-based rivals at room temperature. (See, Bachman et al., *Che. Rev.*, 116:140-162, 2016). Thus, a high operation temperature is required for SSEs to achieve comparable power performance to liquid electrolytes, which inevitably lowers battery cell energy efficiency. In addition, the poor interfacial contact between SSEs and electrode materials compromises ion transport and therefore negatively impacts achievable power output.

A middle lane has been explored to mitigate the above shortcomings of SSEs and liquid electrolytes. By incorporating plasticizer molecules, organic solvents, and inorganic salts into the polymer host, a gel polymer electrolyte (GPE) can be formed in which the polymeric backbone provides structural support but is not wholly solid like SSEs. This gel strategy can deliver comparable ion conductivity, improved interfacial contact, and desirable SEI formation, but simultaneously re-introduces the potential negative factor associated with the presence of flammable volatiles with related undesirable safety concerns.

Another important consideration in rechargeable battery technology is that incorporation of solid or gel electrolytes into such LIBs/LMBs often demands a complete redesign of the cell manufacturing process for mass production, which requires substantial initial investment costs, incurred increased technical risks, and hence slow market penetration and adoption. Therefore, an electrolyte that is non-flammable, ion conductive in a wide range of temperatures, forms good SEI, and is compatible with established mass-production processes is highly desirable in the industry. A solution to this need has yet to be presented in the field of lithium ion/metal batteries.

Disclosed herein are fast cure semi-solid polymer electrolytes (SSPEs) that meet all of the safety demands noted above and that fit squarely within existing manufacturing processes. By forming a strong, yet flexible, electrolyte possessing an aliphatic crosslinked network through the incorporation of a phosphate backbone, the SSPEs described herein exhibit both the key safety attributes of non-flammability and stability characteristic of solid or gel polymer electrolytes, while at the molecular-level are highly solvated cations with organic molecules and polymers that form highly conductive interconnected ion conduction networks. The chelation chemistry formed among cation, organic solvent, and polymer backbone of the SSPEs described herein provide a stable semi-solid region for fast ion transport with minimum volatility.

As the result, the SSPE-based lithium ion/metal batteries described herein exhibit comparable or better ionic conductivity as compared with conventional liquid electrolyte at room temperature and enable a wide range of operational temperature of between −40° C. to 70° C. In an embodiment of the described SSPEs, the rechargeable battery possesses a Li-metal anode and a high voltage layered metal oxide cathode. The unique coordination structure of the described SSPEs also yields a high quality SEI-film that is stable over the long term. In addition, manufacturing of the described SSPEs becomes simplified as a drop-in solution where the in-situ polymerization mechanism can be seamlessly integrated into existing cell manufacturing processes.

SUMMARY

Provided herein are described semi-solid polymer electrolytes (SSPEs) that are not equivalent to fully liquid electrolytes, gel polymer electrolytes (GPEs), or solid-state electrolytes (SSEs). The electrolytes described herein are incorporated into lithium ion batteries of various shapes, sizes, and capacities or energy densities, as desired. Also described are processes for producing the described SSPEs and methods of their incorporation into the manufacture of rechargeable lithium ion batteries.

The SSPEs described herein are made from a polymer, a lithium salt, a first solvent and a second solvent. The polymer is made from a crosslinker (or monomer) and a chemical initiator. Polymerization is triggered by any known means such as UV radiation, heat, or other chemical initiator-based trigger.

The polymer is prepared by polymerization of one or more monomers. The monomers are one or more of, for instance, the following monomers: bis[2-(methacryloyloxy) ethyl] phosphate, bis(acryloyloxy)ethyl phosphate, bis(vinylcarbonyloxy)ethyl phosphate, bis[2-(methylvinylcarbonyloxy)ethyl phosphate, trimethylolpropane triacrylate, trimethylolpropane ethoxylate triacrylate, pentaerythritol triacrylate, pentaerythritol tetraacrylate, di(trimethylolpropane) tetraacrylate, bisphenol A ethoxylate dimethacrylate, di(ethylene glycol) divinyl ether, tri(ethylene glycol) divinyl ether, poly(ethylene glycol) divinyl ether, tetra(ethylene glycol) divinyl ether, poly(ethylene glycol) diacrylate, ethylene glycol diacrylate, 1,6-hexanediol ethoxylate diacrylate, 1,6-hexanediol diacrylate, poly(ethylene glycol) dimethacrylate, ethylene glycol dimethacrylate, bisphenol A dimethacrylate, N,N'-methylenebisacrylamide, 1,6-hexanediol dimethacrylate, and poly(propylene glycol) dimethacrylate.

The lithium salt incorporated into the described SSPEs is not particularly limited. In an embodiment, the lithium salt is any one or more of lithium bis(fluorosulfonyl)imide ($F_2LiNO_4S_2$), lithium bis(trifluoromethylsulfonyl)imide ($LiC_2F_6NO_4S_2$), lithium bis(oxalato)borate, lithium hexafluorophosphate ($LiPF_6$), lithium hexafluoroarsenate ($LiAsF_6$), lithium bis(trifluoromethane) sulfonimide (LiN($SO_2CF_3$)$_2$), lithium trifluoromethanesulfonate ($LiCF_3SO_3$), lithium perchlorate ($LiClO_4$), lithium difluoro oxalato borate anion ($LiBF_2(C_2O_4)$), lithium iodide (LiI), lithium bromide (LiBr), lithium chloride (LiCl), lithium hydroxide (LiOH), lithium nitrate ($LiNO_3$), and lithium sulfate ($LiSO_4$). In one embodiment, the lithium salt is lithium bis(fluorosulfonyl) imide ($F_2LiNO_4S_2$).

In one embodiment the SSPEs described herein incorporate two different solvents. In another embodiment, the two solvents are identical. In one embodiment, the first solvent is any one or more of 1,2-dimethoxyethane, dimethyl carbonate, 1,3-dioxolane, ethyl methyl carbonate, diethyl carbonate, dimethyl sulfoxide, ethyl vinyl sulfone, tetramethylene sulfone, ethyl methyl sulfone, ethylene carbonate, vinylene carbonate, fluoroethylene carbonate, 4-vinyl-1,3-dioxolan-2-one, dimethyl sulfone, methyl butyrate, ethyl propionate, trimethyl phosphate, triethyl phosphate, gamma-butyrolactone, 4-methylene-1,3-dioxolan-2-one, methylene ethylene carbonate, 4,5-dimethylene-1,3-dioxolan-2-one, allyl ether, triallyl amine, triallyl cyanurate, triallyl isocyanurate, and water.

The second solvent, in some embodiments, is any one or more carbonate, fluoroether, and/or fluorobutane solvents. In certain embodiments of the SSPEs described herein, the volume ratio of the first to the second solvent is from 10:1 to 1:3, or from 2:1 to 1:3, or any ratio between these values. For instance, in some embodiments the ratio is from 9:1 to 1:3, from 8:1 to 1:3, from 7:1 to 1:3, from 6:1 to 1:3, from 5:1 to 1:3, from 4:1 to 1:3, or from 2:1 to 1:3.

In one embodiment of the described SSPEs: (a) the lithium salt is lithium bis(fluorosulfonyl)imide, (b) the first solvent is 1,2-dimethoxyethane, (c) the second solvent is any one or more of 1,1,2,2-tetrafluoroethyl-2,2,3,3-tetrafluoropropyl ether, bis(2,2,2-trifluoroethyl) ether, 1,1,2,2,-tetrafluoroethyl-2,2,2-trifluoroethyl ether, tris(2,2,2-trifluoroethyl)orthoformate, pentafluoroethyl 2,2,2-trifluoroethyl ether, 2,2,3,3,4,4,5,5-octafluoro-1-pentanol, methoxynonafluorobutane, ethoxynonafluorobutane, 2,2,2-trifluoroethyl nonafluorobutanessulfonate, dimethyl carbonate, 1,3-dioxolane, ethyl methyl carbonate, diethyl carbonate, dimethyl sulfoxide, ethyl vinyl sulfone, tetramethylene sulfone, ethyl methyl sulfone, ethylene carbonate, vinylene carbonate, and fluoroethylene carbonate, and (d) the monomer is any one or more of bis[2-(methacryloyloxy)ethyl] phosphate, bis(acryloyloxy)ethyl phosphate, bis(vinylcarbonyloxy)ethyl phosphate, bis[2-(methylvinylcarbonyloxy)ethyl phosphate, trimethylolpropane triacrylate, and pentaerythritol tetraacrylate.

In another embodiment of the described SSPE: (a) the lithium salt is lithium bis(fluorosulfonyl)imide, (b) the first solvent is 1,2-dimethoxyethane, (c) the second solvent is any one or more of 1,1,2,2-tetrafluoroethyl-2,2,3,3-tetrafluoropropyl ether, bis(2,2,2-trifluoroethyl) ether, and 1,1,2,2,-tetrafluoroethyl-2,2,2-trifluoroethyl ether, tris(2,2,2-trifluoroethyl)orthoformate, and (d) the monomer is any one or more of bis[2-(methacryloyloxy)ethyl] phosphate, bis(acryloyloxy)ethyl phosphate, bis(vinylcarbonyloxy)ethyl phosphate, and bis[2-(methylvinylcarbonyloxy)ethyl phosphate.

In another embodiment of the described SSPE: (a) the lithium salt is lithium bis(fluorosulfonyl)imide, (b) the first solvent is 1,2-dimethoxyethane, (c) the second solvent is any one or more of 1,1,2,2-tetrafluoroethyl-2,2,3,3-tetrafluoropropyl ether, and tris(2,2,2-trifluoroethyl)orthoformate, and (d) the monomer is any one or more of bis[2-(methacryloyloxy)ethyl] phosphate, bis(acryloyloxy)ethyl phosphate, bis (vinylcarbonyloxy)ethyl phosphate, and bis[2-(methylvinylcarbonyloxy)ethyl phosphate.

In a further embodiment of the described SSPEs, SSPE possesses an ionic conductivity of between 0.1 mS/cm and 0.9 mS/cm at −40° C. In another embodiment, the SSPE possesses an ionic conductivity of between 0.5 mS/cm and 3.0 mS/cm at 25° C.

Also described herein are electrochemical devices that include a first electrode, a second electrode differing from the first electrode in polarity, and any one or more of the SSPEs described herein. In one embodiment the first electrode is a lithium metal anode, and the second electrode is a high voltage layered metal oxide cathode. The electrochemical battery including the described SSPEs is of any known rechargeable battery shape, but in certain embodiments, the device shape is cylindrical, prismatic, coin or button-shaped, or flat or pouch-shaped. In certain embodiments the electrochemical device is a lithium metal battery that is rechargeable. In various embodiments, the rechargeable lithium metal battery is functional, i.e., able to cycle and hold a charge, at from about −40° C. to about 70° C. A specific example of an electrochemical device contemplated herein is an LIB containing the described lithium poly (phosphonate) chelated with fluorinated and diglyme molecules (LPP-FD) as the electrolyte.

Also described herein are compositions for forming the described fast-cure semi-solid polymer electrolyte, which comprise a first solvent, a second solvent, a monomer, a lithium salt, and a chemical initiator, where the solvents, monomer, and lithium salts are as described above. In an embodiment, the chemical initiator is an azo-initiator or a peroxide initiator. Also in certain embodiments, as above, the volume ratio of the first solvent to the second solvent is 10:1 to 1:3, or from 2:1 to 1:3. For instance, in some embodiments the ratio is from 9:1 to 1:3, from 8:1 to 1:3, from 7:1 to 1:3, from 6:1 to 1:3, from 5:1 to 1:3, from 4:1 to 1:3, or from 2:1 to 1:3.

In an embodiment of the described compositions, the chemical initiator is any one or more of 2,2'-azobis(4-methoxy-2,4-dimethylvaleronitrile), 2,2'-azobis(2,4-dimethylvaleronitrile), 2,2'-azobis (2-methylbutyronitrile), 1,1'-azobis(cyclohexane-1-carbonitrile), 4,4'-azobis(4-cyanovaleric acid), dimethyl 2,2'-azobis(2-methylpropionate), 2,2'-azobis[2-methyl-N-(2-hydroxyethyl)propionamide], 2,2'-azobis(isobutyroic acid amidine)dihydrochloride, benzoyl peroxide, tert-butyl peroxybenzoate, tert-butylperoxy isopropyl carbonate cumene hydroperoxide, cyclohexanone peroxide, 2,4-pentanedione peroxide, lauroyl peroxide, and tert-butyl peroxide.

In a certain embodiment of the described composition: (a) the lithium salt is lithium bis(fluorosulfonyl)imide, (b) the first solvent is 1,2-dimethoxyethane, (c) the second solvent is 1,1,2,2-tetrafluoroethyl-2,2,3,3-tetrafluoropropyl ether, and (d) the monomer is any one or more of bis[2-(methacryloyloxy)ethyl] phosphate, bis(acryloyloxy)ethyl phosphate, bis(vinylcarbonyloxy)ethyl phosphate, and bis[2-(methylvinylcarbonyloxy)ethyl phosphate. In such embodiments, the chemical initiator is optionally 2,2'-azobis (2-methylpropionitrile). An exemplary composition of the SSPEs described herein is lithium poly(phosphonate) chelated with fluorinated and diglyme molecules (LPP-FD).

Also described herein are processes for producing the SSPEs described herein. In such processes, for example, the steps involved in producing the SSPE include, but are not limited to: (1) dissolving a lithium salt into a first solvent and a second solvent, wherein the volume ratio of the first solvent to second solvent is 10:1 to 1:3, (2) adding to the dissolved lithium salt a cross-linker and a chemical initiator, (3) stirring for 0.5 to 24 hours at between 0° C. and 50° C. to provide electrolyte precursor, and (4) curing the electrolyte precursor. In certain embodiments of the described processes, curing comprises heating the composition or exposing the composition to ultraviolet radiation.

In one embodiment of the described processes, 2 to 15 wt % of the monomer is added to the dissolved lithium salt, and 0.5 to 5.0 wt % chemical initiator is added to the dissolved lithium salt. Also in certain embodiments, as above, the volume ratio of the first solvent to the second solvent in the described processes is 10:1 to 1:3, or from 2:1 to 1:3. For instance, in some embodiments the ratio is from 9:1 to 1:3, from 8:1 to 1:3, from 7:1 to 1:3, from 6:1 to 1:3, from 5:1 to 1:3, from 4:1 to 1:3, or from 2:1 to 1:3. In other embodiments, the molar ratio of the first solvent to the second solvent is between 0 and 1, and the volume ratio of the first solvent to the second solvent is from 10:1 to 1:3. In other embodiments of the described processes, the volume ratio of the alkaline metal salt to the first and second solvent combined is from 0.01 to 2. In a further embodiment of the described processes, the dissolving step is performed at 25° C. for about 12 hours, and the adding is performed at 25° C. for about five minutes. In various embodiments of the above, the SSPEs are stable and fully operational at temperatures of from −40° C. to 70° C.

Also provided are various uses of the described SSPE in the manufacture of an electrochemical device or rechargeable lithium metal battery. The SSPE is in some instances used in the manufacture of such devices. Various uses of such rechargeable batteries are also provided. A specific example of an electrochemical device is an LIB containing the described lithium poly(phosphonate) chelated with fluorinated and diglyme molecules (LPP-FD) as the electrolyte.

This Summary is provided to introduce a selection of concepts in a simplified form that are further described below in the Detailed Description. This Summary is not intended to identify critical or essential features of the claimed subject matter, nor is it intended to fully limit the scope of the claimed subject matter described more fully hereinbelow.

BRIEF DESCRIPTION OF THE DRAWINGS/FIGURES

For a more precise understanding of the disclosed SSPEs and their methods of manufacture, as well as uses in rechargeable lithium ion batteries, reference is made to specific embodiments thereof illustrated in the drawings. The drawings presented herein are not drawn to scale and any reference to dimensions in the drawings or the following description are with reference to specific embodiments. It will be clear to one of skill in the art that variations of these dimensions are possible while still maintaining full functionality for the intended purpose. Such variations are specifically contemplated and incorporated into this disclosure notwithstanding the specific embodiments set forth in the following drawings.

FIG. 1 is schematic of the proposed molecular structure of an SSPE described herein, wherein the contact ion pair is highlighted in the upper left box and comprises lithium ion bound to an oxygen of 1,2-dimethoxyethane, an oxygen of bis[2-(methacryloyloxy)ethyl]phosphate, and interacting with negatively charged bis(fluorosulfonyl) imide anion. The upper righthand box highlights the aggregate. In this example the SSPE exhibits a distinguishable ion conductive solvation structure or system comprising: 1) polymer-cation-anion-solvent-polymer, or 2) polymer-cation-anion-cation-solvent-polymer. In this exemplary SSPE the solvents are 1,2-dimethoxyethane (DME) and 1,1,2,2-tetrafluoroethyl-2,2,3,3-tetrafluoropropyl ether, the crosslinker is bis [2-(methacryloyloxy)ethyl] phosphate, the metal salt is lithium bis(fluorosulfonyl)imide, and the initiator is an azo-based initiator such as 2,2'-azobis(2-methylpropionitrile).

FIG. 2 is schematic of the proposed molecular structure of an typical gel polymer electrolyte (GPE), wherein the solvent is DME, the metal salt is lithium bis(fluorosulfonyl) imide, and the crosslinker is poly(trimethylolpropane ethoxylate triacrylate, and uses a chemical initiator such as an azo-based initiator, such as, for instance, 2,2'-azobis(2-methylpropionitrile).

FIG. 3 is a bar graph depicting normalized weight (%) vs. time for various exemplary electrolytes showing evaporation of the electrolytes over time. By introducing an oxygen atom-rich polymer backbone as well as adjusting the molar ratio of cation to solvent, the weight loss due to evaporation is about 15% for LPT-D (GPE) and only about 1% for LPP-FD (SSPE) after 3 hours at 25° C. In contrast, the standard liquid electrolyte loses about 40% of the initial weight under the same conditions within the same time period.

Figure 6:
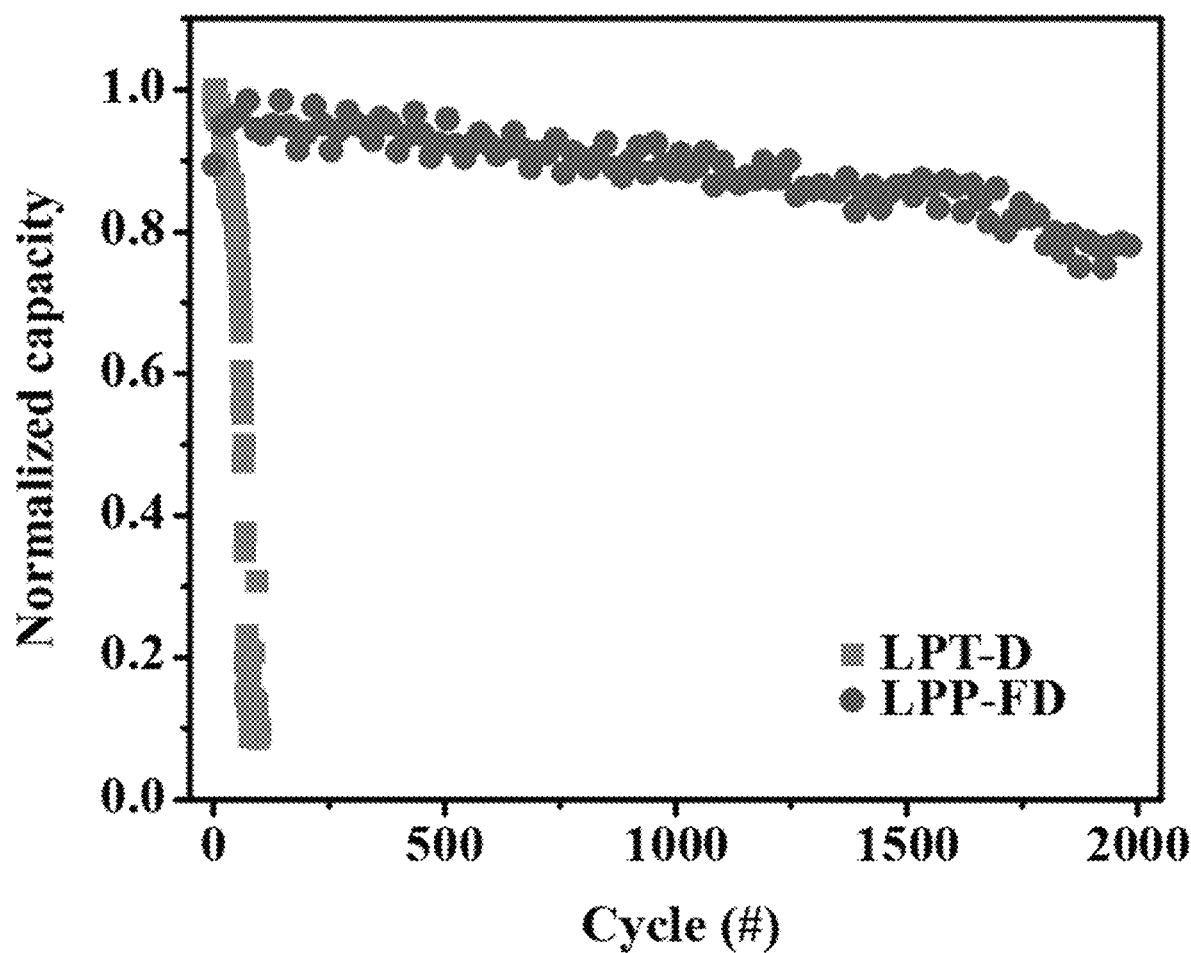

FIG. 6 is a graph of data showing normalized capacity per cycle for two exemplary electrolytes described herein, LPP-FD and LPT-D. The data reveal the cycling stability of the two exemplary electrolytes in Li/NMC (LiNi$_{0.6}$Mn$_{0.2}$Co$_{0.2}$O$_2$) full cells (areal capacity 2 mAh/cm$^2$). The LPP-FD-based cell retains about 80% of the original capacity over 2000 cycles at 1C discharge rate, while the LPT-D-based cell barely delivers any detectable capacity after 150 cycles. These results demonstrate that the LPP-FD SSPE is a superior polymer electrolyte compared with standard GPEs in maintaining a stable SEI on Li-metal anode as well as being oxidatively stable against a high voltage cathode during long-term operation.

Figure 7:
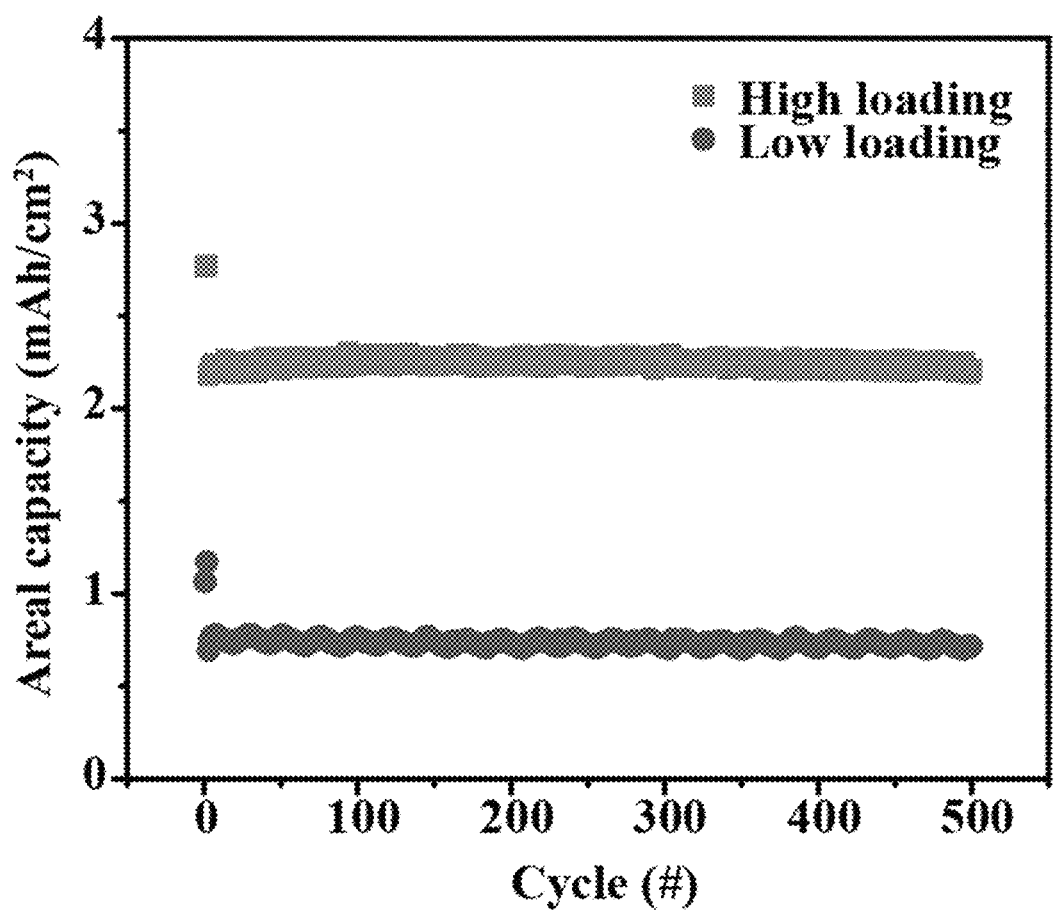

FIG. 7 displays a graph of data showing areal capacity (mAh/cm$^2$) vs. cycle number for the SSPE LPP-FD. The data show good cycling performance regardless of the cathode areal capacity. In conventional electrolytes (liquid or polymer), higher areal capacity usually leads to faster capacity fade due to the presence of a thicker lithium layer utilized per cycle, which accelerates the degradation of the lithium anode.

Figure 8:
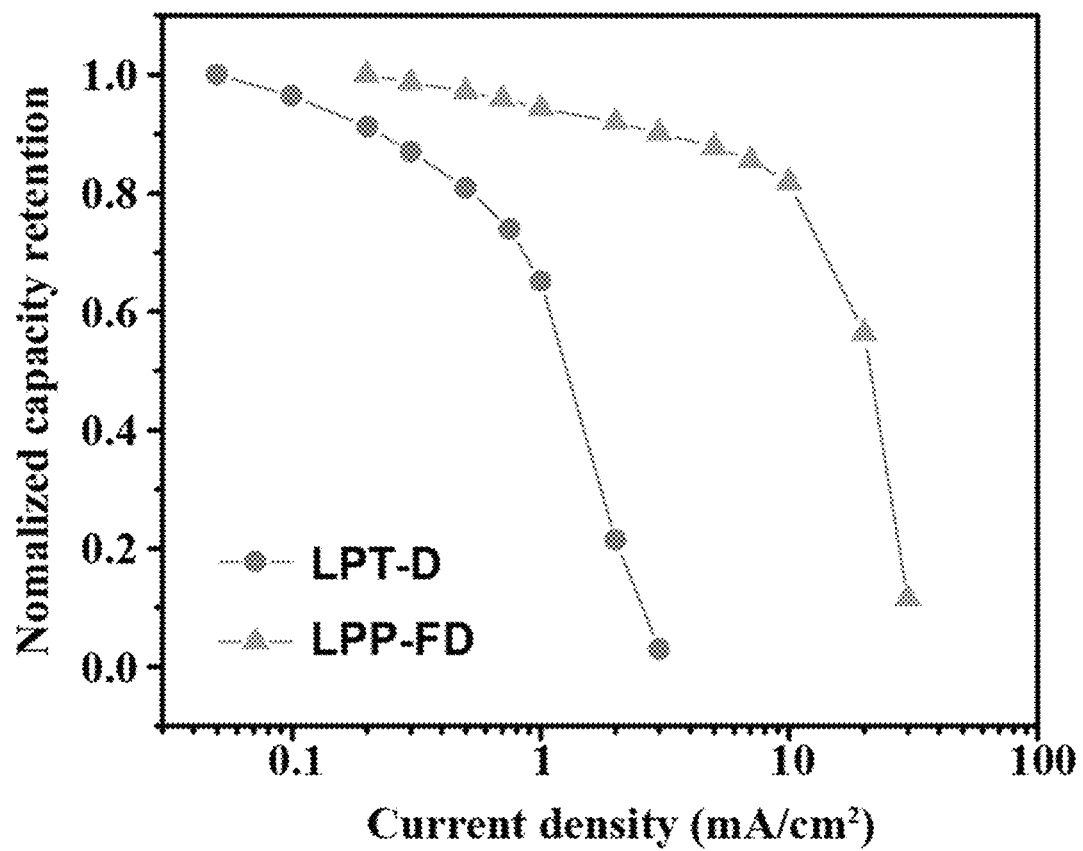

FIG. 8 is a graph of data showing normalized capacity retention vs. current density (mA/cm$^2$) for the LPP-FD (SSPE) and LPT-D (GPE) electrolytes. The data show the rate capability of the two exemplary electrolytes in Li/NMC full cells (areal capacity 2 mAh/cm$^2$). Here, the LPP-FD-based cell retains more than 80% of the initial capacity even at areal current density of 10 mA/cm$^2$, corresponding to 5C discharge (12 minutes to fully discharged state, where 1C is equivalent to a full discharge amount of the battery in 1 hour). In comparison, the LPT-D delivers only 60% of the initial capacity at a low rate of 1 mA/cm$^2$, corresponding to 0.5C discharge (2 hours to fully discharged state).

Figure 9:
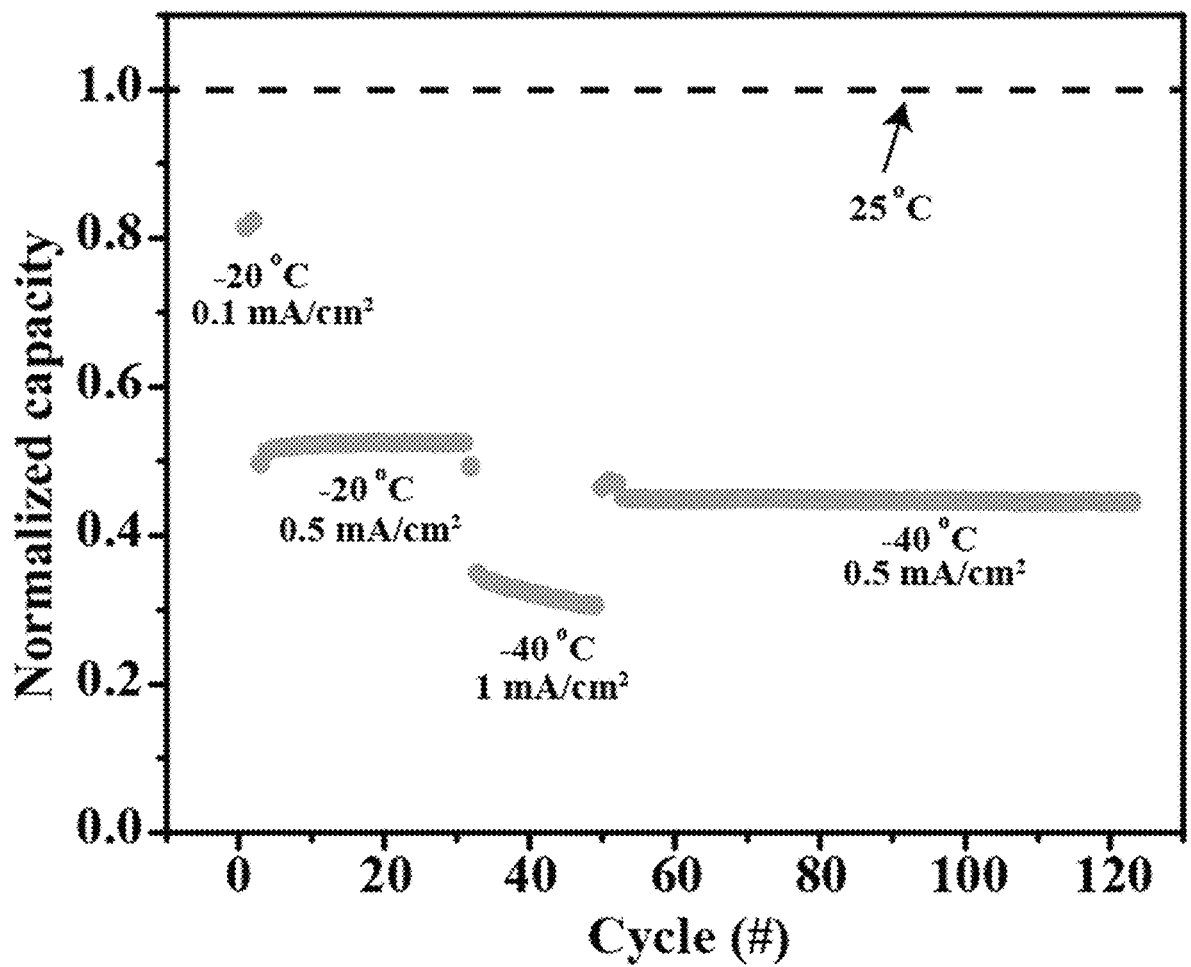

FIG. 9 provides graphed data showing normalized capacity vs. cycle number for the LPP-FD SSPE at various temperatures. Even at −40° C. the LPP-FD-based cell delivers over 40% of the capacity obtained at 25° C. No capacity fade is observed when the cell is operated at 0.5 mA/cm$^2$ (0.25C).

Figure 10:
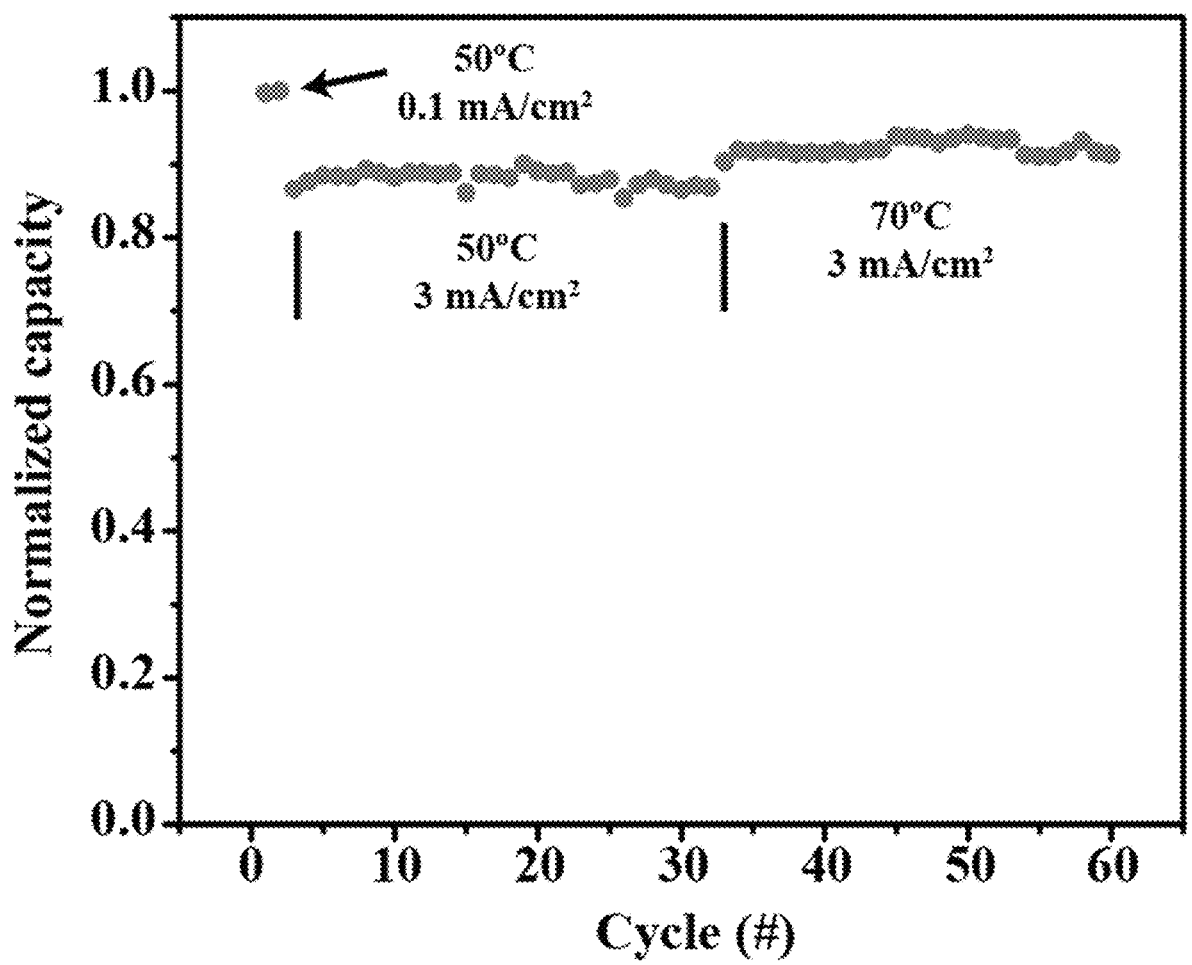

FIG. 10 provides graphed data showing normalized capacity vs. cycle number for the LPP-FD SSPE at various temperatures. The LPP-FD-based cell shows stable cycling at 70° C. with a high current density of 3 mA/cm$^2$ (1.5C).

Figure 11:
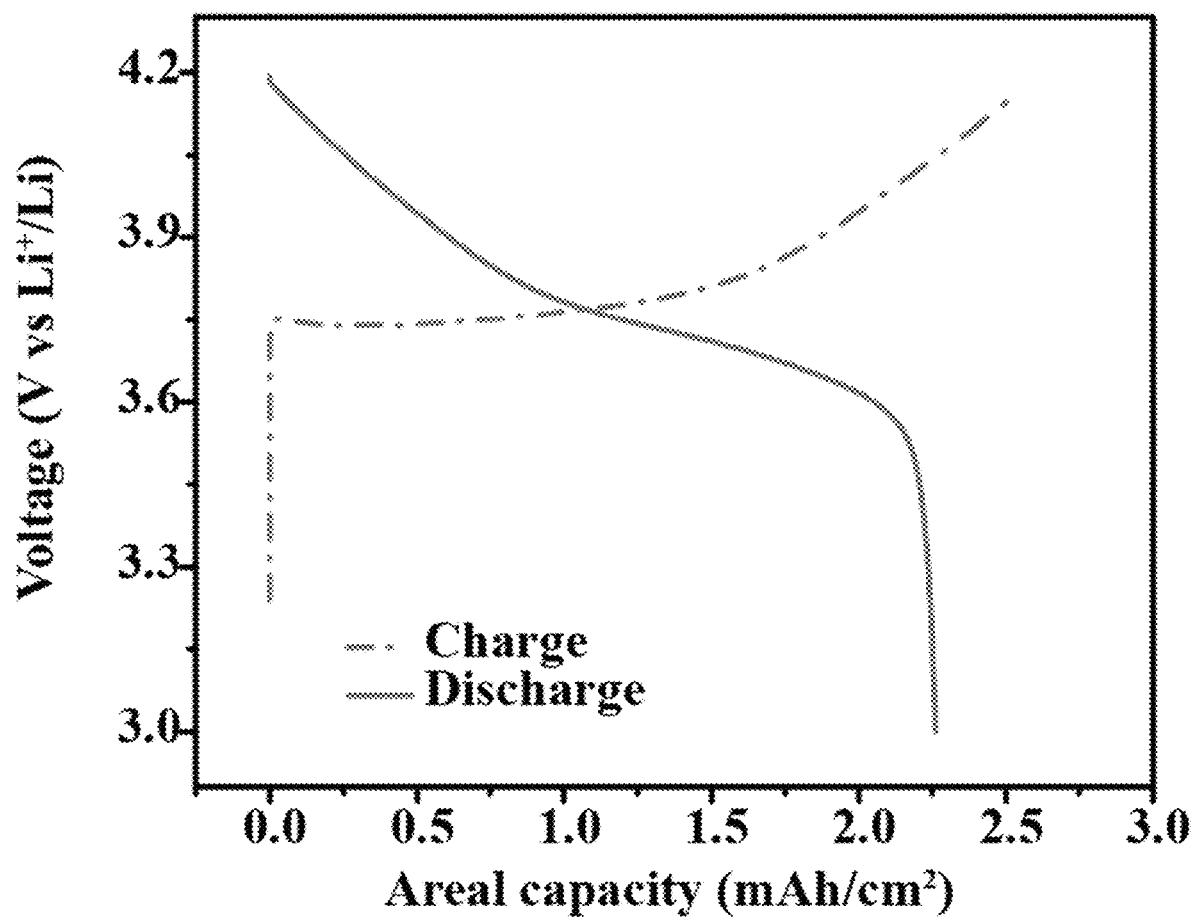

FIG. 11 provides voltage profile data for the LPP-FD-based cell where data is presented as voltage (V vs Li$^+$/Li) vs. areal capacity (mAh/cm$^2$) at 25° C.

Figure 12:
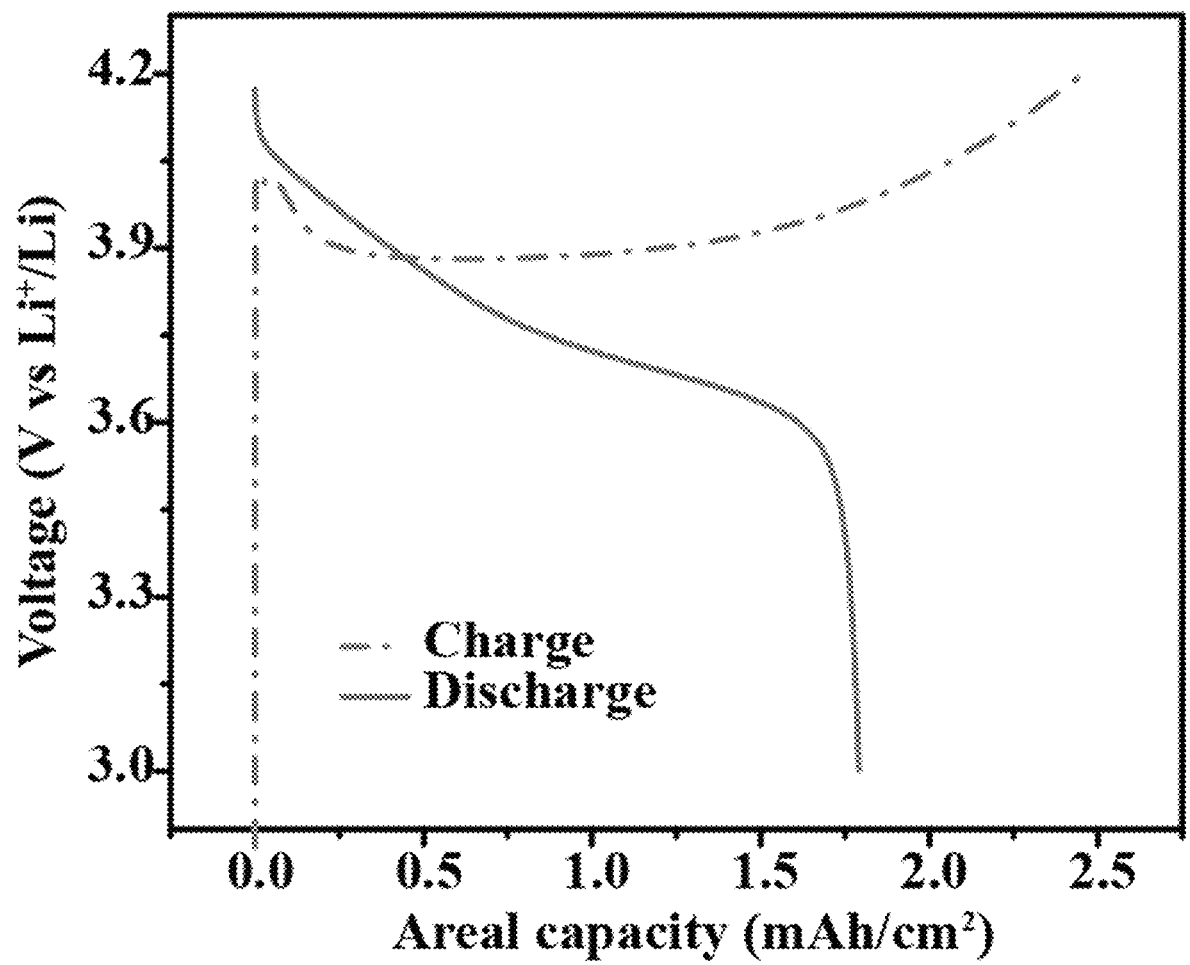

FIG. 12 provides voltage profile data for the LPP-FD-based cell where data is presented as voltage (V vs Li$^+$/Li) vs. areal capacity (mAh/cm$^2$) at −20° C.

Figure 13:
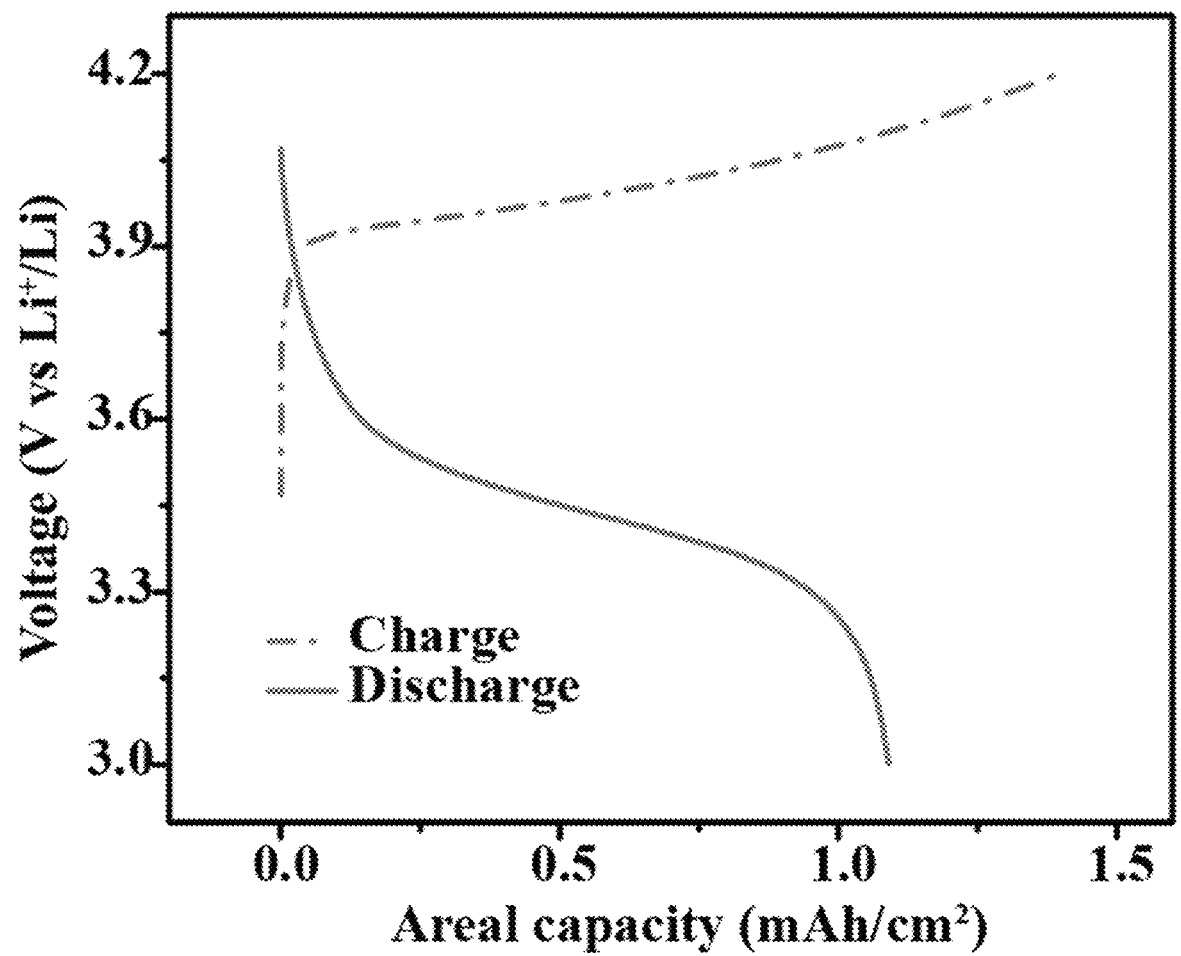

FIG. 13 provides voltage profile data for the LPP-FD-based cell where data is presented as voltage (V vs Li$^+$/Li) vs. areal capacity (mAh/cm$^2$) at −40° C.

Figure 14:
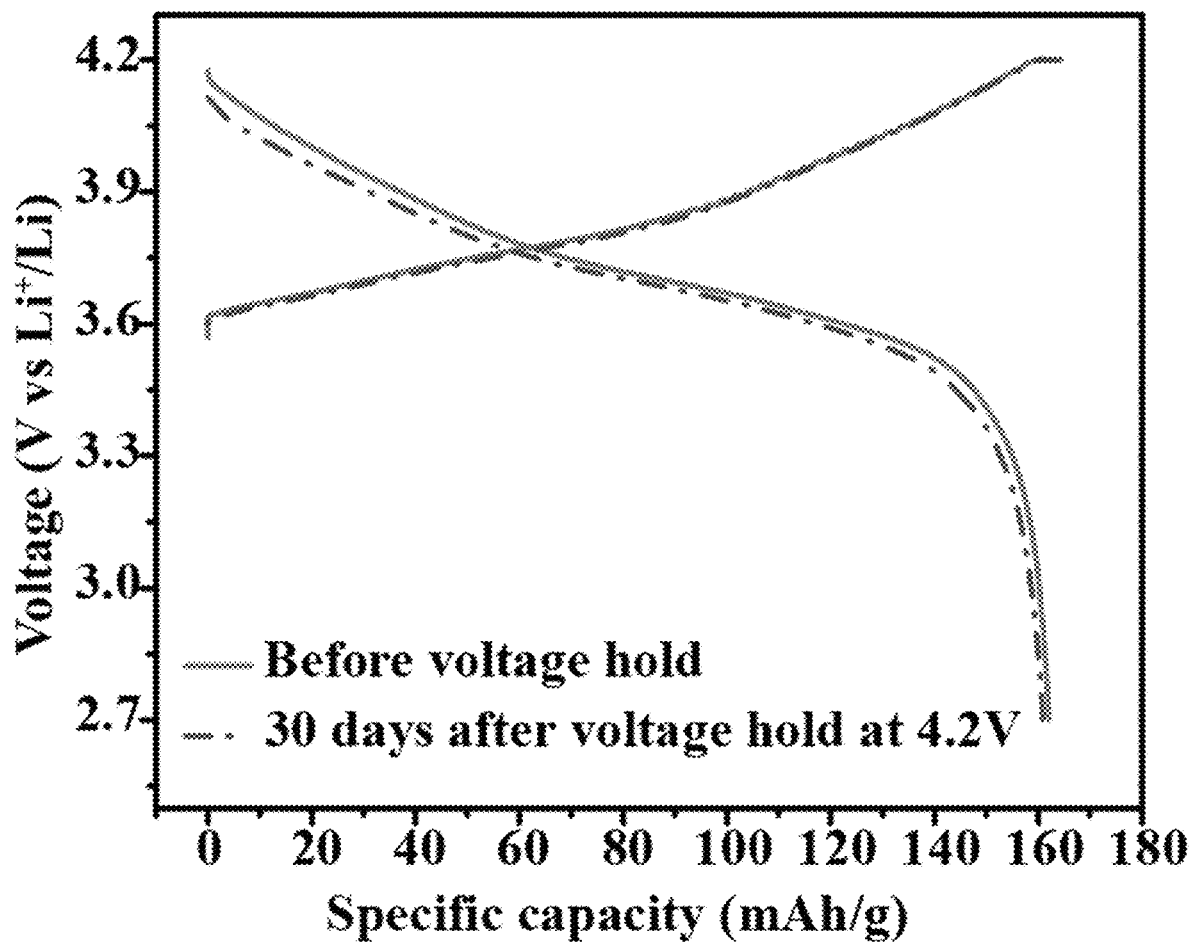

FIG. 14 provides voltage profile data after 30 days voltage hold for the LPP-FD-based cell where data is presented as voltage (V vs Li$^+$/Li) vs. areal capacity (mAh/cm$^2$) at 4.2 volts. The LPP-FD-based cell is fully charged to 4.2V and held at that voltage for a period of one month, followed by a full discharge to evaluate any loss in capacity. Typical Li-ion batteries lose 3% of the capacity per month at fully charged state. The LPP-FD-based cell shows excellent self-discharge performance, with negligible capacity fade.

Figure 15:
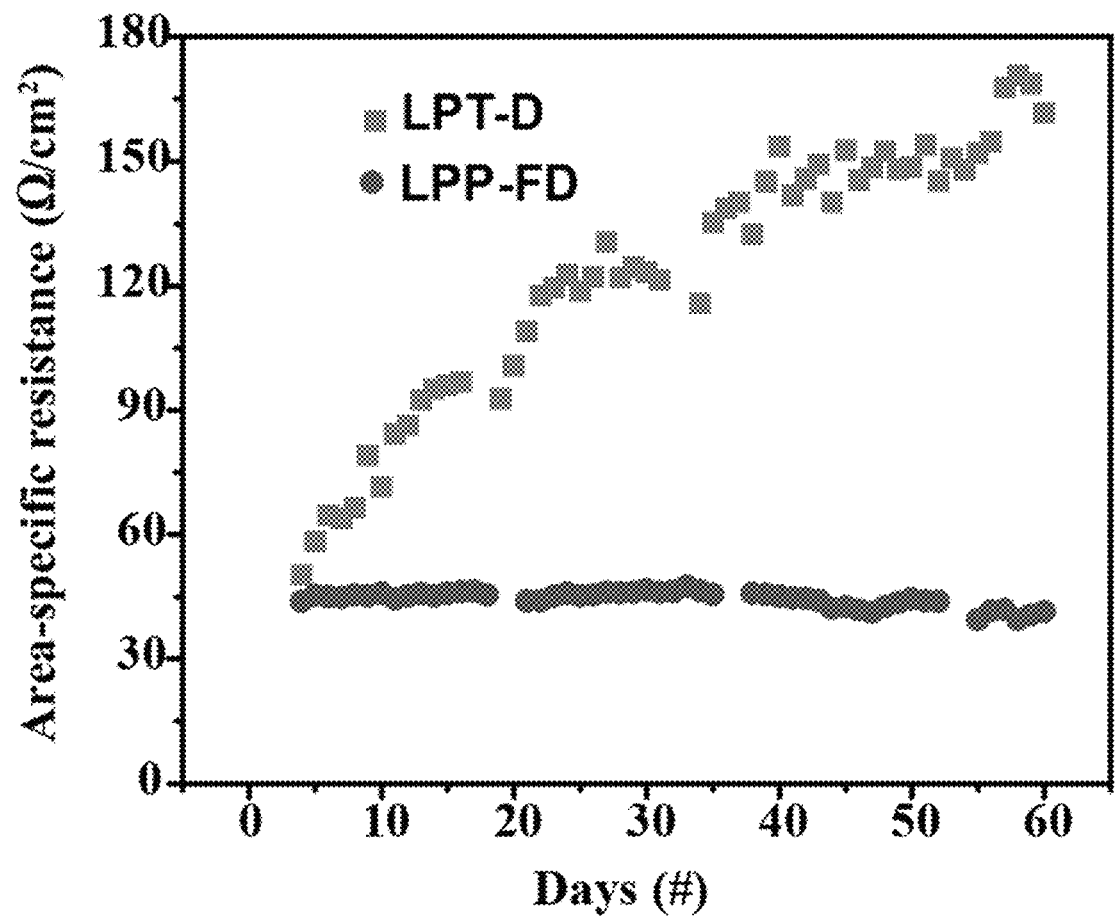

FIG. 15 shows data generated from a comparison of cell resistance rise during voltage hold at 4.2V with the two exemplary polymer electrolytes, LPP-FD (SSPE) and LPT-D (GPE), over a period of 60 days, where data is presented in graph format of area-specific resistance ($\Omega$/cm$^2$) vs. number of days. Any rise in the resistance is an indication of side reactions at high charge potential (4.2V), including corrosion of the current collector and surface reactions of the NMC cathode. The data here show that the LPP-FD SSPE exhibits excellent stability with negligible cell resistance rise over 60 days at 4.2V.

Figure 16:
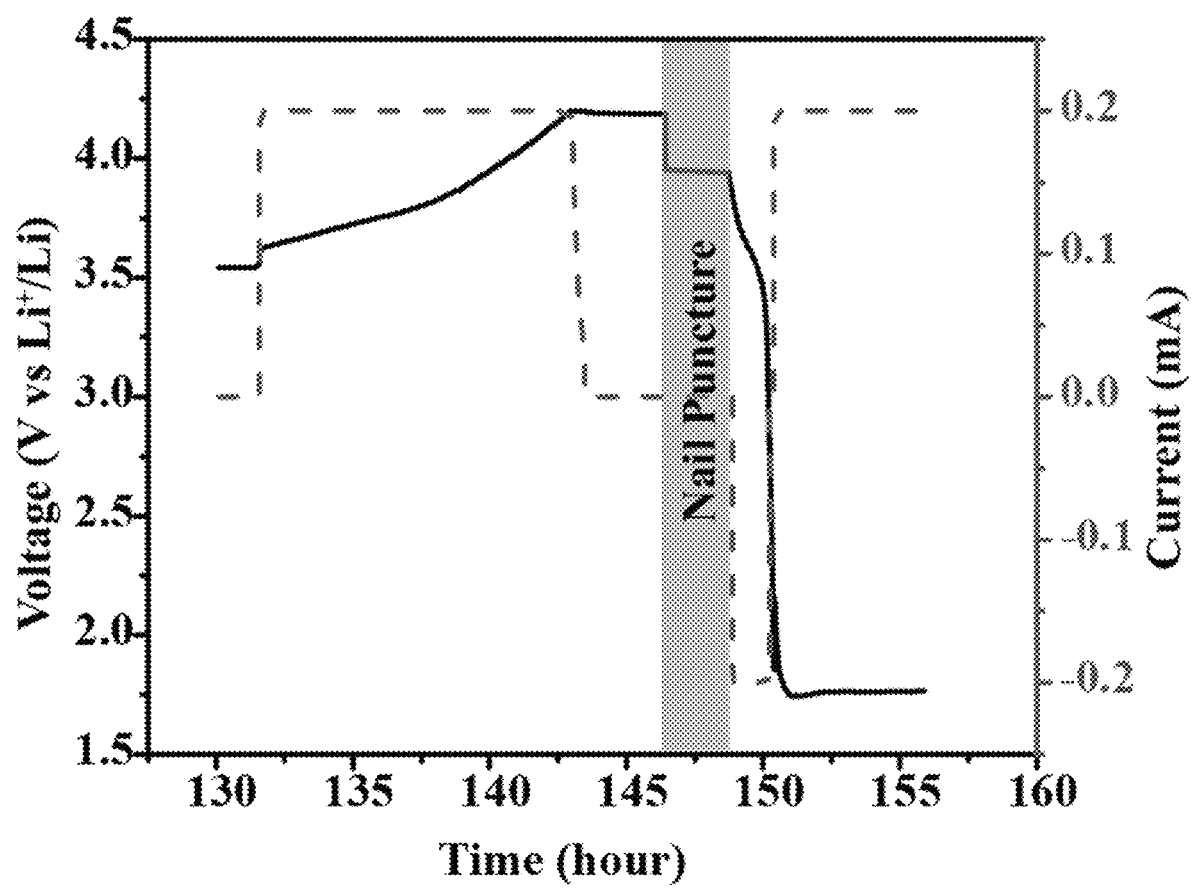

FIG. 16 provides an overlay graphing of voltage profile data, voltage (V vs Li$^+$/Li), or current (mA) vs. time (hours) during nail penetration of an LPP-FD-based cell. The voltage profile shows the voltage drop during nail penetration at fully charged state of 4.2V. The cell is still functional and can be discharged after nail removal. The profile evidences the excellent safety of the LPP-FD-based pouch cell.

Figure 17:
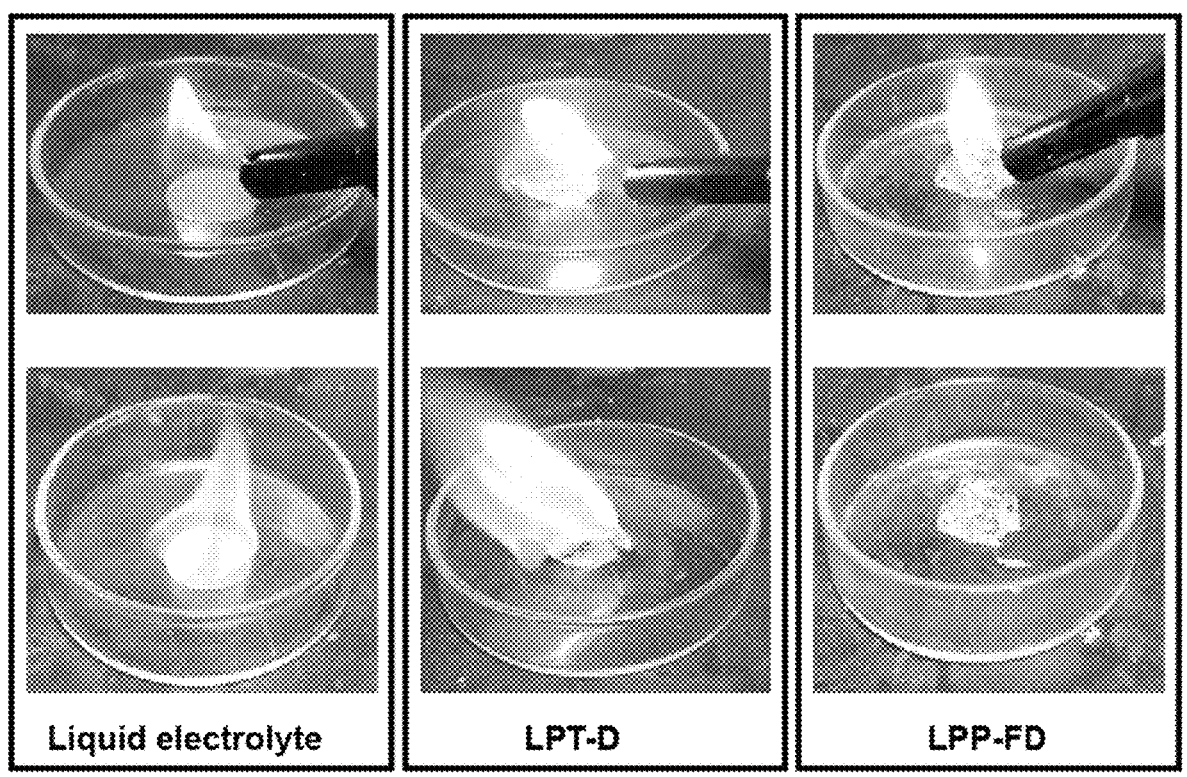

FIG. 17 are photographs showing the ignition by flame of various electrolytes. The top row shows initial flame ignition. The bottom row shows burning after several minutes. The electrolytes are the round white disks in the middle of each petri dish. From left to right are samples the following samples: liquid electrolyte, LPT-D, and LPP-FD. The liquid electrolyte (left column), as baseline, is flammable when ignited with a butane-based lighter, and the fire sustains until the electrolyte is completely consumed. The LPT-D GPE electrolyte (middle column) shows similar phenomenon as liquid electrolyte, except the gel polymer is not flowable whiling burning. The LPP-FD SSPE (right column) is completely inflammable even when torched with sustained fire. Only burn marks with charcoal color are observed on the LPP-FD polymer surface, which is an indication of the formation of a protective film from polymer decomposition.

DETAILED DESCRIPTION

Definitions

The term "a" or "an" entity as used herein refers to one or more of that entity; for example, "an oar," is understood to represent one or more oars. As such, the terms "a" (or "an"), "one or more," and "at least one" are herein used interchangeably herein.

Furthermore, "and/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, the term "about" or "approximately" refers to a variation of 10% from the indicated values (e.g., 50%, 45%, 40%, etc.), or in case of a range of values, means a 10% variation from both the lower and upper limits of such ranges. For instance, "about 50%" refers to a range of between 45% and 55%.

Unless defined otherwise, scientific terms used herein have the same meaning as commonly understood by one of ordinary skill in the art to which this disclosure is related.

Units, prefixes, and symbols are denoted in their Système International de Unites (SI) accepted form. Numeric ranges are inclusive of the numbers defining the range. The headings provided herein are not limitations of the various aspects or aspects of the disclosure, which can be had by reference to the specification as a whole. Accordingly, the terms defined immediately below are more fully defined by reference to the specification in its entirety.

The term "semi-solid" as used herein means a gel that is not liquid and not solid, but possesses a state of viscosity between liquid and solid. The term "semi-solid" as used herein distinguishes the described electrolytes from state-of-the-art or otherwise known or published standard gel electrolytes, such as LPT-D.

As used herein, the term "electrochemical device" means a device whose power is derived from electrochemical sources, such as, but not limited to, fuel cells, such as LIBs or secondary batteries, green energy storage devices. Such fuel cells are in some instances rechargeable fuel cells. Electrochemical devices therefore often possess two electrodes or electrode layers (anode and cathode) and an intervening electrolyte through which ion passes. The electrochemical devices herein utilize lithium ions as the electrically charged carrier. The electrochemical device is not particularly limited in size since its applications range from portable electronic devices, electrical vehicles, electrical airplanes, electrical drones, military grade equipment including sensors, radar, lasers, and other weapon-related technology such as rail guns, electric catapults, ship propulsion systems, back-up power plants, grid-scale energy storage devices, and the like.

To be clear, the terms lithium ion battery (LIB) and lithium metal battery (LMB) are not interchangeable. In the art, it is understood that a lithium ion battery is one in which lithium ion is the electrochemical element shuttling charge from one electrode to another. The movement of lithium ion through the electrolyte from the anode to the cathode and vice versa depending on whether the battery is charging or discharging. Because of the low redox potential and elemental weight of the lithium, LIBs are capable of functioning at a high voltage and capable of a high charge storage per unit mass and unit volume. LIBs may be composed of any number of materials at the anode and cathode. Common examples of LIB electrodes include lithium cobalt oxide, for example, and graphite. Other metals are commonly incorporated into the cathode of LIBs, such as, for instance, layered transition metal oxides where the metal is nickel, manganese, cobalt, etc. The cathode of the LIB is also in some embodiments polyanionic olivine where the metal is iron, manganese, for example. As further non-limiting examples, lithium manganese oxide, lithium iron phosphate, and other metal dichalcogenide are commonly used as the cathode in LIBs. On the other hand, lithium metal batteries (LMBs) are batteries in which the anode comprises at least lithium metal. The cathode of the LMBs described herein are not particularly limited and are comprised of known materials for use in LIBs. Thus, not all LMBs are LIBs. Conversely, not all LIBs are LMBs. Disclosed hereinbelow are electrochemical devices, such as for example LMBs (see examples, below), that utilize or incorporate SSPEs described herein. The term LIBs used hereafter is a generalization of the electrochemical devices of interest, which includes LMBs.

As used herein, the phrase "highly solvated ion conductive phase" means a phase within the electrochemical device that includes: one or more lithium salts, one or more solvents, and one or more monomers that when polymerized creates the SSPE described herein. This phase, described in more detail below, thus is a multi-component highly solvated ion conductive section, region, or three-dimensional space where lithium cation is highly coordinated and chelated with the SSPE polymer network upon polymerization of the one or more monomers described herein. Thus, while the highly solvated ion conductive phase comprises one or more solvents, the solvents themselves are not the only component that creates the precise physical and chemical conditions necessary to result in the described SSPE possessing the described surprising properties.

As used herein, the term "fast-cure" used in the context of polymerization reactions means a polymerization reaction that is completed or substantially completed within minutes or in some instances within seconds, or at least substantially less than an hour (60 minutes or less, 30 minutes or less, 15 minutes or less, 10 minutes or less, 5 minutes or less, 4 minutes or less, 3 minutes or less, 2 minutes or less, or 1 minute or less). (See, for instance U.S. Pat. No. 8,492,033, incorporated herein by reference for all purposes). The term "fast cure" means that the time required to reach 60 to 90% of the final hardness of the cured mass at 25 to 40° C., measured by a Type A durometer in accordance with JIS K6253, does not exceed six hours. As used herein, the term "fast cure" means cure to at least 1 on a Shore OO hardness scale within at least 10 minutes. As used herein, the term "fast cure" means that the time taken until the hardness of a composition being cured reaches 50% of the ultimate hardness is within 4 hours in an environment of 23° C. and relative humidity 50%, the hardness being measured by type A Durometer according to JIS K 6253. For practical purposes, preferably a hardness of at least 15 in type A Durometer scale is reached within 3 hours, or in some embodiments less than 2 hours, or less than 1 hour.

As used herein, the term "chemical initiator" or "initiator" means any chemical species that reacts with a monomer (single molecule that can form chemical bonds) to form an intermediate compound capable of linking successively with a large number of other monomers into a polymeric compound. The chemical initiator is typically first decomposed by exposure to heat (thermal initiators) or photo irradiation (photoinitiators), e.g., light of a certain wavelength or range of wavelengths, such as UV light, and the like. Exemplary and non-limiting classes of such initiators include azo-type polymerization initiators and peroxide-type initiators. Thermal polymerization initiators are compounds that generate radicals or cations upon exposure to heat. Other non-limiting examples of thermal initiators include azo compounds such as 2,2'-azobis(isobutyronitrile) (AIBN) and organic peroxides such as benzoyl peroxide (BPO), both thermal radical initiators, and benzenesulfonic acid esters and alkylsulfonium salts, examples of thermal cation initiators. Photopolymerization chemical initiators include those that generate free radicals, cations (acids), or anions (bases) upon exposure to light. It is contemplated herein that the SSPEs described herein are any of those described here that are useful in processes for producing the described SSPEs. Such chemical initiators of all classes are commercially available from standard reagents supplies such as Sigma Aldrich (MilliporeSigma, St. Louis, Mo., US) and TCI Chemicals America, Inc. (Portland, Oreg., US).

The terms "comprising," "having," "including," and "containing" are to be construed as open-ended terms, i.e., meaning "including, but not limited to," unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The description or recitation herein of any and all examples, or exemplary language, e.g., "such as," are intended merely to better illuminate the embodiments and do not pose a limitation on the scope of the claims unless otherwise stated. No language in the specification is intended to be construed as indicating any non-claimed element as essential to the practice of the invention.

The phrase "consisting essentially of," if and when recited herein, is understood to include those elements specifically recited and those additional elements that do not materially affect the basic and operational characteristics of the claimed embodiments. The phrase "consisting of" excludes any element not specifically specified. In addition, where features or aspects of the disclosure are described in terms of Markush groups, those skilled in the art will recognize that the disclosure is also thereby described in terms of any individual member or subgroup of members of the Markush group.

Semi-Solid Gel Polymer Electrolytes

Herein are described for the first time fast-cure semi-solid polymer electrolytes (SSPEs) that are exceptional in the field because they have been tested and determined to meet very high safety standards as compared with complementary state-of-the-art GPE and the like. Further, the manufacturing of electrochemical devices using the described SSPEs fits squarely within existing manufacturing processes.

The described SSPEs form strong, yet flexible, electrolytes possessing an aliphatic crosslinked network through the incorporation of a phosphate backbone. At the molecular-level, the described SSPEs are highly solvated cations with organic molecules and polymers that form highly conductive interconnected ion conduction networks. The chelation chemistry formed among the cation, organic solvent, and polymer backbone components of the described SSPEs provides a stable semi-solid region for fast ion transport with minimum volatility.

Likely as a result of the molecular structure of these SSPEs, electrochemical devices incorporating such SSPEs, such as LIBs, for example, exhibit comparable or better ionic conductivity as compared with conventional liquid electrolyte at room temperature. Most surprisingly, such devices exhibit a markedly wide range of operational temperatures of between −40° C. to 70° C. This unique coordination structure of the molecular structure of the described SSPEs also yields a high quality SEI-film that is stable over the long term. In addition, manufacturing of the described SSPEs becomes simplified as a drop-in solution where the in-situ polymerization mechanism can be seamlessly integrated into existing cell manufacturing processes.

Figure 1:
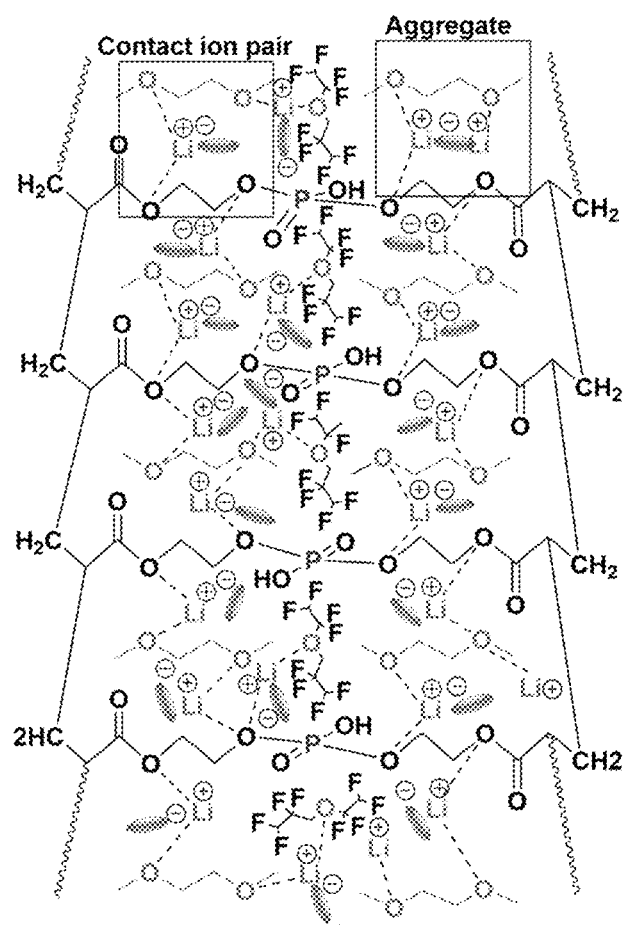
Figure 2:
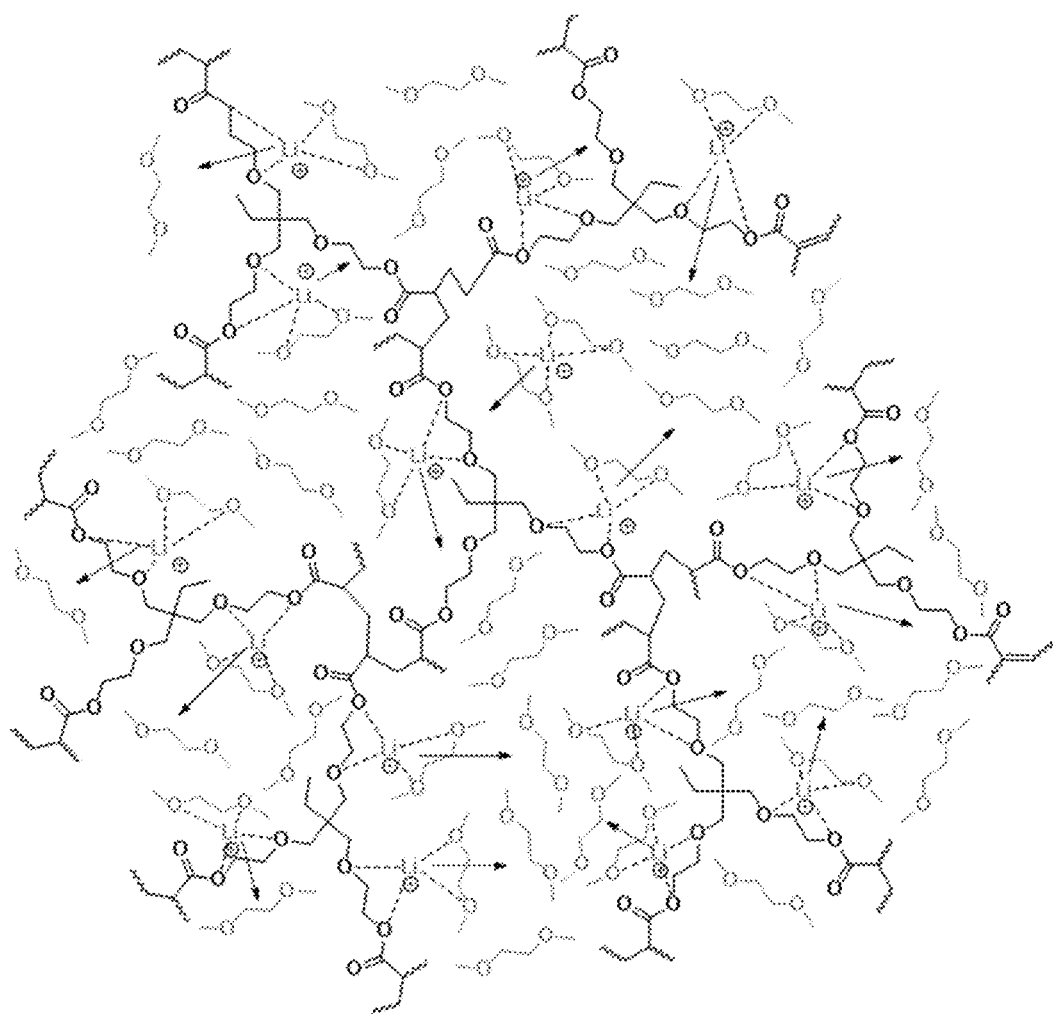

The SSPEs described herein address the need for high ionic conductivity by trapping an ion conductive semi-solid phase inside a crosslinked polymer framework. (See, FIG. 1). FIG. 1 presents a theorized 2-dimensional view of the interaction of various components of an exemplary SSPE (LPP-FD). It is believed that the various components of the LPP-FD form the indicated chemical framework. This crosslinked polymer framework is controlled through both the type of polymer present as well as the selection of cation and solvent species. To achieve the remarkable results described herein, a fast-crosslinking polymer chemistry (fast-cure) is incorporated into the SSPEs that interacts and traps the highly solvated ion conductive phase to form semi-solid polymer electrolytes within seconds. In contrast, the closest relative to the describes SSPEs, for example the LPD-T GPE, has a different theoretic chemical structure, as depicted in FIG. 2. FIG. 2 represents a theorized 2-dimensional depiction of the chemical interactions that define state-of-the-art GPE compounds.

The SSPE chemical network design disclosed herein also surprisingly leads to remarkably high ionic conductivity of up to 3.6 mS/cm at 27° C. and 0.9 mS/cm at −40° C., which are at least comparable to the state-of-the-art liquid electrolytes which suffer from many safety issues. To address and minimize, e.g., nearly eliminate, the flammability issues that plague standard liquid electrolytes, a fire-retardant polymer framework is directly incorporated into the SSPE structure. The homogenous distribution of the fire-retardant motifs ensures the non-flammability of the described SSPE, which resists ignition even under direct and continuous exposure to a 1900° C. flame (see examples, below).

The chemical network design of the describes SSPEs additionally provides a remarkable reduction in volatility of the electrolyte, which is reduced by a factor of four (4×) compared to conventional liquid electrolytes. Reduction in volatility is vital for mitigating any gaseous pressure that could build up upon the accretion of flammable and corrosive electrolyte vapor. The surprisingly low volatility of the described SSPEs ensures safe cell fabrication and operation. Without wishing to be bound by theory, it is believed that the decreased volatility is derived from the lack of free solvent molecules, which is directly attributable to the optimized coordination structure among all electrolyte components captured within the fire retardant polymer structure framework. (See, FIG. 1).

Such unique solvation structures as found in the described SSPEs yield surprisingly high electrode/electrolyte stability. By forming both polymer-cation-anion-solvent-polymer chains as well as polymer-cation-anion-cation-solvent-polymer aggregates, the chemical structures of the described SSPEs yield extremely low decomposition rate as compared with state-of-the-art liquid or GPE models, which will substantially increase the calendar life (shelf life) of any electrochemical device with negligible capacity loss over 30 days or more during storage at room temperature.

It was further discovered that the SSPEs described herein, when used for manufacture of electrochemical devices, yield a battery cell life cycle that is significantly extended, which may be due to the formation of inch-perfect electrode/electrolyte interphase with low resistance and high ionic conductivity. Lithium metal anode Coulombic efficiencies were determined for the described SSPEs to be over 99% in half-cell configurations, which is consistent with cells delivering low-capacity fade rates where 80% of the capacity is retained over 2000 cycles.

The flexibility and elasticity of the SSPEs described herein also ensures an intimate contact between electrodes and electrolyte, leading to very low perceived interfacial resistance. While not wishing to be bound by any specific theory, it is possible that this surprising result is due to the incorporation into the described SSPEs of both polymer and solvents.

As a result, the high ionic conductivity, non-flammability, flexibility, fast fabrication process, as well as low resistance interphase formed for high power and high energy batteries, are all outcomes directly attributed to the SSPE compositions described herein. The combination of high ionic conductivity, fire-tolerance, and low resistance interphase is indispensable for electrical vehicles, electric airplanes, and other electric transportation equipment, demanding high power and energy longevity. Standard legacy liquid and solid-state electrolytes simply are not able to fulfill these modern industry needs.

Two types of state-of-the-art, or legacy, polymer electrolytes in use today, including: (1) solid polymer electrolytes (SPEs), and (2) gel polymer electrolytes (PPEs or GPEs). SPEs are formed by dissolving inorganic salts into a functional (polar) polymer. The polar groups in the polymers possess electrostatic interactions and form weakly coordinating bonds with cations. The cations move from one coordinated site to another when exposed to an electrical field. The energy barrier of such movement of electrons is subject to the bonding strength between the polymer and the cation. However, the bonding strength at room temperature is usually too strong to achieve reasonable ion conductivity, e.g., greater than 10-4 mS/cm, and hence an elevated temperature is required for normal operation, e.g., 60° C. or more for polyethylene oxide (PEO)-based SPE.

Conventional GPEs are generally formed by incorporating and "locking" plasticizer molecules/organic solvent/inorganic salts into a polymer host structure, providing only structural support, in theory. The high dielectric and low viscosity liquid solvents comprising GPEs will form a percolating network that provides fast ion conduction. The disadvantages of GPEs are that volatiles are released while there is a tradeoff in mechanical strength.

In contrast, the described SSPEs integrate the advantages of the SPEs and GPEs but entirely avoids all of their known shortcomings. The described SSPEs do not compromise mechanical strength by forming a rigid aliphatic chain, but instead the described SSPEs allow for the formation an interconnected ion conduction network made with highly solvated cations with organic molecules and polymers (see, FIG. 1). The chelation among cation, organic solvent, and polymer backbone is believed to provide a stable semi-solid region for ion transport that minimizes volatility.

Without wishing to be bound by theory, it is posited that the high ionic conductivity observed for the SSPEs described herein is rooted in the abundant ion conduction pathways present in the polymer as well as low ion transport kinetic barriers presented by the polymer backbone structure. In electrochemical devices incorporating the described SSPEs, the cation is believed to be transported via one or more routes, including: (1) direct hopping between adjacent coordinated sites of polymer chains under an electrical field, which resembles the ion conduction mechanism in typical SPE; and/or (2) organic molecule-assisted hopping within the percolating network formed by solvent/polymer co-solvated ion channels, which is a transport mechanism distinguishable from typical GPEs and SPEs known in the art. Without wishing to be bound by theory, it is postulated that when subjected to an electrical field, the cations move across the polymer networks of the described SSPEs by reversibly chelating with organic solvent molecules and coordination sites on the SSPE polymer backbone. Without wishing to be bound by theory, it is believed that the anion movement in the described SSPEs is largely restricted due to at least the following factors: (1) physical trapping in the polymer network, and/or (2) ionic bonding with cation under stoichiometric condition. The highly solvated ion conductive phase is a highly solvated ion conductive section, region, or three-dimensional volume where the lithium cation is highly coordinated and chelated within the SSPE network formed with cation, anion, solvent molecules, and polymer upon polymerization in the presence of cation, anion, solvent molecules, and monomer. For a solvent to be functionally contribute to a highly solvated ion conductive phase in the SSPEs described herein, the solvent (or solvents) must possess the functional chemical attributes noted herein in terms of coordination chemistry, chelation, and molecular bonding that allows flow of cation as described herein in the context of the described SSPEs.

Without wishing to be bound by any specific theory, one could postulate that the manner in which the SSPEs described herein contribute to the non-flammability of electrochemical devices incorporating the SSPEs is by one or more of the following mechanisms: (1) Condensed phase thermal shielding: the phosphorous-containing polymer backbone, when heated, likely decomposes and forms a poly(phosphoric acid) (PPA) structure that reacts with hydroxyl or other synergistic groups to form a non-stable phosphate ester. The dehydration of the phosphate ester leads to a build-up of carbon foam on the surface of the device and against the heat source (charring) and yielding intumescence (becoming enlarged or swollen). The carbon barrier, it is postulated, could then act as an insulation layer, preventing further decomposition of the material. This presumptive carbon barrier would also separate the remaining ingredients in the device from oxygen and hence prevent the formation of flammable gasses; (2) Gas phase radical quenching: the phosphorous-containing polymer and its decomposed ingredients (especially PO radical) is also known to exhibit flame inhibition properties in the gas phase. These chemical species can react and replace active hydrogen and hydroxy radicals thus yielding fewer effective radicals, leading to a lower potential of propagation of the radical oxidation reactions of combustion. These chemical species can also generate other harmless species by radical combination termination in the gas phase. The overall effect of these reactions would then be to reduce hydrogen and hydroxy radical concentrations which would mitigate heat release, deaccelerate the burning process, and suppress fire propagation; and/or (3) it is noted that the fluorinated molecules are inert to flammable radical generation/propagation in a heated environment and its presence and chelation in the polymeric framework reduces the overall electrolyte flammability. In this model, due to strong electron-withdrawing fluorine groups all around the molecules, the polymer does not generate or propagate radicals. Under extreme conditions, the SSPE may act similarly to chlorinated and brominated materials that undergo thermal degradation to generate halogen radicals to react with hydrogen and hydroxy radicals, which is similar in concept to gas phase radical quenching.

As mentioned, the described SSPEs possess a surprisingly low volatility. Volatility is the result of molecules overcoming the kinetic energy barrier in liquid phase and entering gas phase. Reducing volatility requires raising the energy required for molecules to escape the liquid phase. In the described SSPEs, it is postulated that perhaps the individual components, i.e., the oxygen atoms of organic solvent molecules and polymeric branches, are strongly chelated with cations, which, in turn, increases the kinetic energy barrier for molecule movement and thereby prevents evaporation compared to free solvent molecules. The stoichiometric ratio among cation, solvent, and polymers in the described SSPEs, therefore, needs to be controlled to minimize the presence of any unbound liquid components. Such chelation can be formed by: (1) contact ion pair, in which a cation is coordinated by two oxygen atoms and an anion; and/or (2) aggregate, in which two cations share an anion, and are coordinated by three oxygen atoms. The strong chelation among cation, organic solvent, and polymer backbone of the SSPEs described herein provides a stable semi-solid region for ion transport with minimized volatility.

Solid-electrolyte interphase, or SEI, is a thin organic/inorganic film that forms on the surface of electrode material, e.g., an anode of an LIB, and has profound effects on determining battery performance because it forms a passivation layer on the surface of the anode that inhibits further electrolyte decomposition. That is, SEI is generated by the decomposition of electrolytes at a given electrochemical potential in the first few charging cycles of an electrochemical device. (See, for instance, Heiskanen et al., *Joule*, 3(10):2322-2333, 2019). The SEI layer or composition is determined by the electrolyte composition and the sequence of the decomposition reactions of each electrolyte component. While not fully understood mechanistically, the general consensus in the field is that a thin inorganic-rich SEI, e.g., LiF and $Li_2O$, is considered desirable. In a conventional electrolyte, the presence of uncoordinated solvent molecules forms a solvent-separated ion-pair structure, where the decomposition reaction is mainly dominated by the free solvent molecules. Solvent decomposition generates a thick SEI with organic species that are not beneficial for electrochemical performance. In the SSPEs described herein, while not wishing to be bound by theory, it is postulated that perhaps the stoichiometric pairing of solvent, cation, and polymer of the described SSPEs alters the solvation structure and excludes free solvent molecules, which changes the decomposition potential from solvent to anion. Thus, the decomposition products in electrochemical devices incorporating the described SSPEs become inorganic-rich and thereby promote battery/device performance in terms of cyclability, rate capability, as well as safety.

Coulombic efficiency, or CE (also sometimes referred to as faradaic efficiency or current efficiency), is defined as the efficiency of charge transfer, i.e., the efficiency by which electrons are transferred, in reversible lithium-metal deposition (plating) and stripping. A CE lower than 100% means loss of active lithium (Li) during a complete deposition/stripping cycle. In a Li-limited cell configuration, any loss of active Li (yielding "dead" Li, i.e., lithium molecules that no longer electronically or ionically participate in reactions, i.e., lithium ions that are typically oxidized or otherwise changed to a non-electrochemically active species) results in fade of the energy device's capacity. The loss of active Li is mainly believed to be caused by: (1) excess formation of SEI, and (2) formation of "dead" Li. While not wishing to be bound by any specific theory, it is possible that the volume expansion and high surface-area of dendritic Li formation could expose fresh Li surface for SEI growth which consumes active Li inventory. In addition, the mechanically soft and thin Li "whiskers" of Li dendrites could break off from the substrate and becomes electrically separated for further electrochemical reactions. It is postulated that the described SSPEs lead to formation of a highly ion-conductive and mechanically-robust SEI that could prevent, inhibit, or otherwise depress high surface area Li dendrite formation and thus mitigate electrolyte consumption and dead Li formation, which collectively improves the overall CE of Li metal cycling.

It has been surprisingly found that the class of SSPEs described herein operate to dramatically extend the range of temperatures at which electrochemical devices incorporating the SSPEs can operate or function. For instance, it has been found that the exemplary SSPE LPP-FD is functional at from −40° C. to as high as 70° C. That is, the SSPEs described herein provide electrochemical devices incorporating them with ability to cycle from as low as −40° C. to as high as 70° C. (See, Example 9 and Example 10). Cycling was conducted with 3 formation cycles at 0.1 mA/$cm^2$ and continuous cycling at 3 mA/$cm^2$ between 2.7-4.2 V vs. $Li^{+/0}$ on exemplary electrochemical devices incorporating the SSPEs described herein and it was surprisingly found that these devices, even at −40° C., at which temperature most liquid electrolyte would freeze, delivered over 40% of the capacity obtained at 25° C. No capacity fade was observed when the cell was operated at 0.5 mA/$cm^2$ (0.25C). Voltage profiles of such devices exhibit normal functionality even at these ultra-low temperatures. The same tests were performed also at 50° C. and 70° C., where the exemplary device incorporating the described SSPE exhibited surprisingly stable cycling with a high current density 3 mA/$cm^2$ (1.5C).

Thus, the described SSPEs, in some embodiments deliver over 40%, over 45%, over 50%, over 55%, over 60%, over 65%, over 70%, over 75%, and sometimes even over 80% capacity even at temperatures from about −40° C., −35° C., −30° C., −25° C., −20° C., −15° C., −10° C., −5° C., 0° C., 5° C., 10° C., 15° C., 20° C., 25° C., 30° C., 35° C., 40° C., 45° C., 50° C., 55° C., 60° C., 65° C., and even as high as about 70° C., or higher.

As shown in Example 7, below, an exemplary electrochemical device comprising the described SSPEs exhibited an exceptional cycling performance over prolonged period. Such devices functioned with as much as 70%, 75%, 80%, 85%, 90%, and even 95% or more retention of original capacity over 1500, 1600, 1700, 1800, 1900, 2000, 2100, or even 2200 cycles or more at 1C discharge, where 1C is defined as fully discharging the battery in 1 hour. In comparison, the electrochemical device incorporating the state-of-the-art standard GPE was barely function after only 150 cycles.

The described SSPEs also provide surprising rate functionality in cycle testing. (See, Example 8). Exemplary electrochemical devices incorporating the described SSPEs retain great than 70%, 75%, 80%, 85%, or even 90% or more initial capacity even at current densities of 10 mA/$cm^2$, corresponding to 5C discharge, where 1C is defined as fully discharging the battery in 1 hour.

Exemplary electrochemical devices incorporating the described SSPEs exhibit remarkably low self-discharge rates over prolonged periods of time. (See, Example 11). Such devices exhibit no detectable capacity fade 25, 30, 35, 40, 45, 50, 55, 60, 65, 70, 75, 80, 85, or even 90 days or more storage at ambient temperature.

Electrochemical devices incorporating the described SSPEs further exhibit surprising oxidative stability at a fully charged state over prolonged periods of time. (See, Example 12). For instance, such exemplary devices, when fully charged, and then rested for a period of time, with a daily charge and discharge pulses with trickle charges are capable of exhibit no detectable change in area-specific resistance rise over as many as 30, 35, 40, 45, 50, 55, 60, 65, 70, 75, 80, 85, and as many as 90 days or more.

It is to be understood that the SSPEs described herein exhibit such characteristics even under different charge amounts, different device capacities, different cycle parameters, and the like. These parameters are provided as certain specific embodiments of the functional behavior of the described devices comprising the described SSPEs.

Ionic conductivity functionality of the described SSPEs also exhibits surprising functionality. (See, Example 6). The described SSPEs exhibit surprising conductivity performance of 3 mS/cm at 25° C., in one embodiment, i.e., for the LPP-FD SSPE. For other described SSPEs, the conductivity is, for instance, about 2 mS/cm at 25° C., 2.5 mS/cm at 25° C., 3.0 mS/cm at 25° C., 3.5 mS/cm at 25° C., 4.0 mS/cm at 25° C. or even higher. At lower temperatures, the exemplary SSPEs exhibit conductivities at, for instance, 0.9 mS/cm at −40° C., i.e., for the LPP-FD SSE. For other SSPEs described herein, conductivities of about 0.5 mS/cm at −40° C., 0.6 mS/cm at −40° C., 0.7 mS/cm at −40° C., 0.8 mS/cm at −40° C., 0.9 mS/cm at −40° C., 1.0 mS/cm at −40° C., 1.1 mS/cm at −40° C., 1.2 mS/cm at −40° C., 1.3 mS/cm at −40° C., 1.4 mS/cm at −40° C., or even as high as about 1.5 mS/cm at −40° C. or more are contemplated herein. The same physical chemical functionality as described from the SSPE at 25° C. and −40° C., in other embodiments is also observed even as low as −60° C. or −70° C., in certain embodiments.

The described SSPEs are comprised of certain components, including one or more solvents, and monomers from which the polymer network structure is formed. These components are described in more detail below.

In one embodiment, the solvents are: 1) 1,2-dimethoxyethane, and 2) 1,1,2,2-tetrafluoroethyl-2,2,3,3-tetrafluoropropyl ether, and/or tris(2,2,2-trifluoroethyl)orthoformate. In this embodiment, the monomer is any one or more of bis[2-(methacryloyloxy)ethyl]phosphate, bis(acryloyloxy) ethyl phosphate, bis(vinylcarbonyloxy)ethyl phosphate, and bis[2-(methylvinylcarbonyloxy)ethyl phosphate. In a particular embodiment, the monomer is bis[2-(methacryloyloxy)ethyl] phosphate. In this particular embodiment, the lithium salt is bis(fluorosulfonyl)imide. In this embodiment, the SSPE is called LPP-FD, which stands for lithium poly (phosphonate) chelated with fluorinated and diglyme molecules.

SSPE Solvents

In one embodiment, only one solvent is incorporated into the SSPE. In another embodiment, there two solvents incorporated into the SSPE. In a further embodiment, three or more different solvents are incorporated into the SSPE.

In one embodiment, the solvent useful in the presently described SSPEs include, but are not limited to any one or more of 1,2-dimethoxyethane, dimethyl carbonate, 1,3-dioxolane, ethyl methyl carbonate, diethyl carbonate, dimethyl sulfoxide, ethyl vinyl sulfone, tetramethylene sulfone, ethyl methyl sulfone, ethylene carbonate, vinylene carbonate, fluoroethylene carbonate, 4-vinyl-1,3-dioxolan-2-one, dimethyl sulfone, methyl butyrate, ethyl propionate, trimethyl phosphate, triethyl phosphate, gamma-butyrolactone, 4-methylene-1,3-dioxolan-2-one, methylene ethylene carbonate, 4,5-dimethylene-1,3-dioxolan-2-one, allyl ether, triallyl amine, triallyl cyanurate, triallyl isocyanurate, and water.

In another embodiment, the solvent is selected from carbonate, fluoroether, and/or fluorobutane solvents. In one embodiment, the any one or more carbonate, fluoroether, and/or fluorobutane solvents are combined with any one or more of the solvents listed in the previous paragraph.

In one embodiment, the carbonate, fluoroether, and/or fluorobutane solvents are, for instance, any one or more of 1,1,2,2-tetrafluoroethyl-2,2,3,3-tetrafluoropropyl ether, bis (2,2,2-trifluoroethyl) ether, 1,1,2,2,-tetrafluoroethyl-2,2,2-trifluoroethyl ether, tris(2,2,2-trifluoroethyl)orthoformate, pentafluoroethyl 2,2,2-trifluoroethyl ether, 2,2,3,3,4,4,5,5-octafluoro-1-pentanol, methoxynonafluorobutane, ethoxynonafluorobutane, 2,2,2-trifluoroethyl nonafluorobutanessulfonate, dimethyl carbonate, 1,3-dioxolane, ethyl methyl carbonate, diethyl carbonate, dimethyl sulfoxide, ethyl vinyl sulfone, tetramethylene sulfone, ethyl methyl sulfone, ethylene carbonate, vinylene carbonate, and fluoroethylene carbonate.

In one embodiment, the solvent in the highly solvated ion conductive phase is 1,2-dimethoxyethane, also known as glyme. In another embodiment, the solvent in the highly solvated ion conductive phase is only 1,2-dimethoxyethane and no other solvents are used in the manufacture of the SSPE or incorporated into the SSPE.

In a further embodiment, the SSPE incorporated at least two solvents in the highly solvated ion conductive phases, where the second is any one or more of 1,1,2,2-tetrafluoroethyl-2,2,3,3-tetrafluoropropyl ether, bis(2,2,2-trifluoroethyl) ether, and 1,1,2,2,-tetrafluoroethyl-2,2,2-trifluoroethyl ether, tris(2,2,2-trifluoroethyl)orthoformate. In another embodiment, the SSPE incorporates at least two solvents in the highly solvated ion conductive phase, and the second solvent is 1,2,2-tetrafluoroethyl-2,2,3,3-tetrafluoropropyl ether and/or tris(2,2,2-trifluoroethyl)orthoformate. In a particular embodiment, the SSPE incorporated at least two solvents in the highly solvated ion conductive phases, where the second solvent is 1,1,2,2-tetrafluoroethyl-2,2,3,3-tetrafluoropropyl ether. Such solvents are commercially available from known chemical manufacturing companies and the like, e.g., Sigma Aldrich (St. Louis, Mo., US).

In particular embodiments, any one or more of the above-mentioned solvents in the highly solvated ion conductive phase are combined in various ratios to provide the describes SSPEs. In a particular embodiment of the SSPE, there are two solvents in the highly solvated ion conductive phase selected from those described above, which are present in a ration of the first solvent to the second solvent of from 2:1 to 1:3. In some embodiments the ratio of first solvent to second solvent is 0.1, 0.2, 0.3, 0.4, 0.5, 0.6, 0.7, 0.8, 0.9, or 1.0 (v/v). In other embodiments, the v/v ratio of first solvent to second solvent is 2.0, 1.9, 1.8, 1.7, 1.6, 1.5, 1.4, 1.3, 1.2, 1.1, or 1.0.

In certain embodiments of the described SSPEs, the amount of lithium salt expressed as a ratio with the total amount of solvent in the highly solvated ion conductive phase present in the SSPE is from 0.01 to 2.0 (w/v). In some embodiments, the ratio of lithium salt to total solvent is 0.01, 0.02, 0.03, 0.04, 0.05, 0.06, 0.07, 0.08, 0.09, 0.10, 0.12, 0.14, 0.16, 0.18, 0.20, 0.25, 0.30, 0.35, 0.40, 0.45, 0.50, 0.55, 0.60, 0.65, 0.70, 0.75, 0.80, 0.85, 0.90, 0.95, 1.0, 1.1, 1.2, 1.3, 1.4, 1.5, 1.6, 1.7, 1.8, 1.9, or even 2.9 (w/v).

SSPE Monomers

Monomers are incorporated into the described SSPEs through polymerization. Polymerization is achieved by addition of crosslinkers and chemical initiators. These crosslinkers and chemical initiators are further described hereinbelow as are the conditions of polymerization. Certain combinations of crosslinkers and initiators require certain types of energy to trigger polymerization, as described in further detail below. In this section, the various monomers that, when polymerized, form the basic structure or backbone of the described SSPEs are described in more detail. Note that these monomers are contemplated herein as being incorporated into the described SSPEs singly or in combinations. The monomers described herein are sometimes alternatively referred to as "crosslinkers." The two terms, crosslinkers and monomers, are used interchangeably herein.

The monomer incorporated into the described SSPEs is selected from one or more of the following: bis[2-(methacryloyloxy)ethyl] phosphate, bis(acryloyloxy)ethyl phosphate, bis(vinylcarbonyloxy)ethyl phosphate, bis[2-(methylvinylcarbonyloxy)ethyl phosphate, trimethylolpropane triacrylate, trimethylolpropane ethoxylate triacrylate, pentaerythritol triacrylate, pentaerythritol tetraacrylate, di(trimethylolpropane) tetraacrylate, bisphenol A ethoxylate dimethacrylate, di(ethylene glycol) divinyl ether, tri(ethylene glycol) divinyl ether, poly(ethylene glycol) divinyl ether, tetra(ethylene glycol) divinyl ether, poly(ethylene glycol) diacrylate, ethylene glycol diacrylate, 1,6-hexanediol ethoxylate diacrylate, 1,6-hexanediol diacrylate, poly(ethylene glycol) dimethacrylate, ethylene glycol dimethacrylate, bisphenol A dimethacrylate, N,N'-methylenebisacrylamide, 1,6-hexanediol dimethacrylate, and poly(propylene glycol) dimethacrylate.

In one embodiment, the monomer is any one or more of bis[2-(methacryloyloxy)ethyl] phosphate, bis(acryloyloxy) ethyl phosphate, bis(vinylcarbonyloxy)ethyl phosphate, bis [2-(methylvinylcarbonyloxy)ethyl phosphate, trimethylolpropane triacrylate, and pentaerythritol tetraacrylate. In one particular embodiment, the monomer is bis[2-(methacryloyloxy)ethyl] phosphate. In one particular embodiment, the monomer is bis(acryloyloxy)ethyl phosphate. In another particular embodiment, the monomer is bis(vinylcarbonyloxy)ethyl phosphate. In a further particular embodiment, the monomer is bis[2-(methylvinylcarbonyloxy)ethyl phosphate. In yet another particular embodiment, the monomer is trimethylolpropane triacrylate. In a further embodiment, the monomer is pentaerythritol tetraacrylate.

Certain SSPEs described herein incorporate monomers selected from any one or more of bis[2-(methacryloyloxy) ethyl] phosphate, bis(acryloyloxy)ethyl phosphate, bis(vinylcarbonyloxy)ethyl phosphate, and bis[2-(methylvinylcarbonyloxy)ethyl phosphate.

Such monomers are contemplated as being combined with any one or more of the solvents in the highly solvated ion conductive phase noted above. Thus, the surprising functional features characterizing the presently described SSPEs are achieved in any combination of the monomers and solvents in the highly solvated ion conductive phase described herein, without exception based on the understanding and postulated theories of chemical function believed to contribute to the surprising results proven herein. Thus, the SSPE achieves these surprising functional results due to specific chemical features of each of the solvents in the highly solvated ion conductive phase and monomer combinations described herein. Such monomers are commercially widely available from known chemical manufacturing companies and the like, e.g., Sigma Aldrich (St. Louis, Mo., US). Azo-initiators belong to the class of free radical.

SSPE Chemical Initiators

Chemical initiators are generally known in the art and function to absorb and transfer energy into polymerization reactions. In doing so the initiator is consumed. The phrase "polymerization initiator" and "chemical initiator" and "initiator" are used interchangeably herein and mean the same thing, i.e., a class of chemical compounds that upon exposure to energy of a certain type, catalyze polymerization of monomers in the solution in which they reside. Chemical initiators are generally of a few different categories, including, but not limited to, thermal initiators, photopolymerization initiators, free radical initiators, ionic polymerization initiators, amine photochemical co-initiators, and the like. The chemical initiator used to catalyze polymerization of the monomers described herein is not particularly limited, but certain particular embodiments of initiators are described hereinbelow.

In certain embodiments of the methods for manufacturing the SSPEs described herein, a chemical initiator is added to the solution of solvent(s), lithium salt(s), and monomer(s). The initiator, in one embodiment, is free radical initiator, such as an azo-initiator or a peroxide initiator. In one embodiment, the initiator is an azo-initiator. In another embodiment, the initiator is a peroxide initiator.

In certain embodiments, the azo-initiator is any one or more of 2,2'-azobis(4-methoxy-2,4-dimethylvaleronitrile), 2,2'-azobis(2,4-dimethylvaleronitrile), 2,2'-azobis (2-methylbutyronitrile), 1,1'-azobis(cyclohexane-1-carbonitrile), 4,4'-azobis(4-cyanovaleric acid), dimethyl 2,2'-azobis(2-methylpropionate), 2,2'-azobis[2-methyl-N-(2-hydroxyethyl)propionamide], 2,2'-azobis(isobutyroic acid amidine) dihydrochloride. In a particular embodiment, the initiator is 2,2'-azobis(4-methoxy-2,4-dimethylvaleronitrile) (AIBN).

In certain embodiments described herein, the initiator is any one or more of benzoyl peroxide, tert-butyl peroxybenzoate, tert-butylperoxy isopropyl carbonate cumene hydroperoxide, cyclohexanone peroxide, 2,4-pentanedione peroxide, lauroyl peroxide, and tert-butyl peroxide. In a particular embodiment, the initiator is benzoyl peroxide.

Azo-initiators are known to belong to the broader class of radical initiators and become catalytic when exposed to heat. Azo-initiators possess an azo group (R—N=N—R'), which decomposes rapidly with heat and/or light and forms carbon radicals. Such reactive species readily interact with available vinyl monomers and the like to trigger the polymerization reaction. Such initiators are water-soluble, oil-soluble, are sometimes categorized as macro-azo-initiators, and the like. Such initiators are commercially broadly available from known chemical manufacturing companies and the like, e.g., Sigma Aldrich (St. Louis, Mo., US). The conditions for triggering polymerization using peroxide and/or azo-initiators are known in the art and are known to be generally mild, i.e., temperatures of between about 40° C. to about 60° C.

SSPE Lithium Salt

The lithium salt incorporated into the SSPEs described herein functions to carry ions from one electrode to another. Thus, the exact source of lithium is not particularly limited, but certain embodiments of lithium salt are provided hereinbelow. For a functioning electrochemical device, such as a battery, certain elements are required including electrodes, electrolytes, and a casing protecting these components from exposure to the surrounding electrical circuitry and air, etc.

In one embodiment, the lithium salt is selected from one or more of lithium bis(fluorosulfonyl)imide ($F_2LiNO_4S_2$), lithium bis(trifluoromethylsulfonyl)imide ($LiC_2F_6NO_4S_2$), lithium bis(oxalato)borate, lithium hexafluorophosphate ($LiPF_6$), lithium hexafluoroarsenate ($LiAsF_6$), lithium bis (trifluoromethane) sulfonimide ($LiN(SO_2CF_3)_2$), lithium trifluoromethanesulfonate ($LiCF_3SO_3$), lithium perchlorate ($LiClO_4$), lithium difluoro oxalato borate anion ($LiBF_2(C_2O_4)$), lithium iodide (LiI), lithium bromide (LiBr), lithium chloride (LiCl), lithium hydroxide (LiOH), lithium nitrate ($LiNO_3$), and lithium sulfate ($LiSO_4$). In one embodiment, the lithium salt is lithium bis(fluorosulfonyl)imide ($F_2LiNO_4S_2$). In another embodiment, the lithium salt is a combination of LiFSI with any one or more of lithium bis(trifluoromethylsulfonyl)imide, lithium bis(oxalato)borate, $LiPF_6$, $LiAsF_6$, $LiN(SO_2CF_3)_2$, $LiCF_3SO_3$, $LiClO_4$, lithium difluoro oxalato borate anion, LiI, LiBr, LiCl, LiOH, $LiNO_3$, and $LiSO_4$.

Methods of Producing SSPEs

The disclosed SSPEs are manufactured by standard processing steps that are easily integratable into established manufacturing lines for electrochemical devices, such as rechargeable lithium metal batteries (LIBs). As described in more detail below, these SSPEs are prepared in a simple, quick, and efficient manner by steps that are in some instances not sequence specific.

In an exemplary embodiment, the lithium salt is first dissolved in one or more of the solvents to form a homogeneous solution. The order in which the solvent or solvents are added to the lithium salt is not particularly limited. However, in certain embodiments, the ratio of lithium salt to solvent(s) is within a range of about 0.01 to 2. In some embodiments, the weight per volume ratio of lithium salt to total solvent is 0.01, 0.02, 0.03, 0.04, 0.05, 0.06, 0.07, 0.08, 0.09, 0.10, 0.12, 0.14, 0.16, 0.18, 0.20, 0.25, 0.30, 0.35, 0.40, 0.45, 0.50, 0.55, 0.60, 0.65, 0.70, 0.75, 0.80, 0.85, 0.90, 0.95, 1.0, 1.1, 1.2, 1.3, 1.4, 1.5, 1.6, 1.7, 1.8, 1.9, or even 2.9 (w/v).

As explained herein, this ratio of lithium salt to solvent is adjustable depending on which lithium salt is selected and other reaction components. The ratio is tuned such that the SSPE maintains the molecular framework with the various chelation points mentioned herein. Without wishing to be bound by theory, it is believed that the decreased volatility of the described SSPEs is derived from the lack of free solvent molecules, which is directly attributable to the optimized coordination structure among all electrolyte components captured within the fire retardant polymer structure framework. Thus, the amount of solvent should be matched to the amount of lithium salt and other components of the SSPE such that the amount of free solvent molecules is minimized.

The dissolving step whereby the lithium salt is dissolved in the one or more solvents is in certain embodiments conducted at ambient temperature, or about 25° C. for a sufficient amount of time to allow all of the salt to dissolve in the solvent. The temperature is not particularly limited and published protocols exist for the proper dissolution of metal salts into solvents. In some embodiments the dissolving step occurs with stirring or other means of agitating the solvent to speed up the dissolution process. The dissolving time varies from anywhere between 0.5 hours and 24 hours, depending on the temperature, identity of lithium salt identity of the one or more solvents, and the temperature at which the dissolution is conducted, as well as the means by which the solution is stirred or otherwise agitated, shaken, tilted, etc. In one embodiment, the amount of time for dissolution is about 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 10.0, 11.0, 12.0, 13.0, 14.0, 15.0, 16.0, 17.0, 18.0, 19.0, 20.0, 21.0, 22.0, 23.0, or as much as 24.0 hours or more. Likewise, the temperature at which dissolution occurs is anywhere from 0° C. to as high as 50° C. or more. In certain embodiments, dissolution occurs at 0° C., 5° C., 10° C., 15° C., 20° C., 25° C., 30° C., 35° C., 40° C., 45° C., 50° C., or even as high as 55° C. or more, so long as there is no risk of combustion, fire, or rapid evaporation of the solvent, etc. such that the targeted ratio of lithium salt to solvent is not inadvertently altered out of the desired range.

In another step of the process for producing the described SSPEs, the monomer is added to the solution of lithium salt dissolved in solvent(s). In one embodiment, one or more monomers are added to the lithium salt that is fully dissolved in the solvent(s). In another embodiment, the one or more monomers are first dissolved in the one or more solvents, and then the lithium salt is added and fully dissolved therein. In other words, the order of addition of monomer and lithium salt to the solvent(s) is not particularly limited. In this step, in certain embodiments, the one or more monomers is added at about 25° C. However, in other embodiments the one or more monomers are added at different temperatures, i.e., from about 0° C., 5° C., 10° C., 15° C., 20° C., 25° C., 30° C., 35° C., 40° C., 45° C., 50° C., or even as high as 55° C. or more, so long as there is no risk of combustion, fire, or rapid evaporation of the solvent, etc. such that the targeted ratio of first solvent to optional second solvent is not inadvertently altered out of the desired range.

In certain embodiments where multiple solvents are incorporated into the SSPE, such as two solvents, it is beneficial to maintain a certain ratio volume of the first solvent to the second solvent. In such embodiments, this ratio is from about 2:1 to 1:3. In some embodiments the ratio of first solvent to second solvent is 0.1, 0.2, 0.3, 0.4, 0.5, 0.6, 0.7, 0.8, 0.9, or 1.0 (v/v). In other embodiments, the v/v ratio of first solvent to second solvent is 2.0, 1.9, 1.8, 1.7, 1.6, 1.5, 1.4, 1.3, 1.2, 1.1, or 1.0, as noted above.

As with the order of addition of the lithium salt to the one or more solvents and/or the addition of the one or more monomers to the one or more solvents, etc., in embodiments where there is more than one solvent incorporated into the SSPE it is contemplated that the multiple solvents are either first added together in a certain ratio and then mixed with the lithium salt and/or monomer, or that, for instance, one solvent is used to dissolve the lithium salt and one solvent is used to dissolve the monomer, and the like. In other words, the order of addition of the first solvent, second solvent, lithium metal, and monomer is not particularly limited. All of these additions are contemplated as being performed at the temperatures and for the times noted above, adhering to the ratios also noted above.

The chemical initiator is added to the one or more solvents in another step. Again, as noted above, the order of addition of the chemical initiator, in relation to the first/second solvent, the lithium salt, and the monomer is not particularly limited. Ultimately, regardless of order of addition, a final solution of solvent(s), monomer(s), lithium salt (s), and chemical initiator(s) is obtained. This final solution comprising lithium salt, solvent, monomer, and initiator is, in some embodiments, then stored or otherwise sealed for long term storage for later use. In such embodiments, it is contemplated that these stored or sealed containers of solvent(s), monomer(s), lithium salt (s), and chemical initiator (s) are shelf stable, do not decompose over time, and are transportable in safety sealed containers designed for containing such chemicals. For instance, in one embodiment, this final solution is mixed in one building or plant, sealed for storage, and then optionally transported to another building, another city, another country, etc. for final processing into the end product SSPEs. In another embodiment, this solution is packaged for storage and/or transport without the chemical crosslinker added. In some embodiments, the chemical crosslinker is unstable, or another component of the solution is unstable, and is in those situations not added until just before use. In such embodiments, the final solution described above does not have all of the components since in some instances one or more components are not sufficiently stable to be stored for long periods of time and/or cannot be safely transported over long distances.

In a further step, the final solution described above, any missing components of the final solution are then added to the solution and the final solution is thoroughly mixed to create a homogeneous solution just prior to curing. The final solution comprising the one or more solvents, the one or more monomers, the one or more lithium salts, and the one or more initiators is poured or otherwise conveyed to or into a cell for curing. Following the addition of the final solution to its final destination within the electrochemical device, for instance into an empty fuel cell, the solution is then cured.

The final step of curing is achieved by heating or exposure to certain wavelengths of light or any other means by which the chemical initiator is initiated, as described above. The steps of pouring the final solution into the electrochemical device, or a component of the electrochemical device designed to store or hold electrolyte, and curing, is in some instances performed in a single step. In other embodiments, these steps are performed multiple times, so that multiple layers of the SSPE are built up. In some embodiments, these steps are repeated and other components of the fuel cell or other elements of the electrochemical device are added or inserted between SSPE layers to finally achieve the desired end product. In one embodiment the final end product is a fuel cell comprising two electrodes and one or more of the SSPEs described herein.

In one embodiment, the curing step is a fast-cure step. Fast-cure catalysis is contemplated herein in order to efficiently produce the desired SSPE within the fuel cell or other element of the electrochemical device as rapidly as possible. In this manner, the liquid final solution is able to be poured into a mold or a part of a fuel cell prior to catalysis and formation of the polymer network. This allows full and robust contact of the SSPE produced thereby with all surfaces of all electrodes simultaneously (or in steps, as outlined above). The resulting maximization of contact between the SSPE and the electrodes lends the surprising and desirable properties of the SSPEs described herein. This feature also provides easy incorporation or adaptation of the described SSPEs to nearly any possible configuration desired for application of the SSPE in electrochemical devices of all types.

In one embodiment, the curing step is achieved by exposure of the final solution to heat. In one embodiment, the heat temperature is from about 40° C. and lasts for about 10 minutes or more. In another embodiment, the curing step is achieved by exposure to heat temperature of about 35° C., 40° C., 45° C., 50° C., 55° C., or even 60° C. or more, and for about 1, 2, 3, 4, 5, 6, 7, 8, 9, 10, 15, 20, 25, 30, 35, 40, 45, 50, 60, 90, 120, 150, 180, 210, or 240 minutes or more. The amount of time and amount of heat applied during the curing step will in some instances depend on the amount of final solution being cured. In other words, as more final solution is being cured, for instance in very large batches, more time and heat will be needed as compared with very small final SSPE products.

Use of the SSPEs in Manufacture of Electrochemical Devices

The SSPE described herein are suitable for use in various electrochemical devices, as already mentioned above. Due to the chemical nature and molecular structure of the designed SSPEs described herein, various remarkable and surprising properties are provided by the described SSPEs, such as high safety levels exhibited through extreme heat tolerance, low evaporation rate, and other features described above. Other surprising properties achieved by the described SSPEs include various remarkable performance standards, whereby the SSPEs described herein are able to easily beat the performance of comparable GPE and liquid electrolytes commonly in use today for manufacture of lithium metal rechargeable or other energy storage devices, such as increased cycling capabilities, increased maintenance of stored energy without dissipation over very long periods of time, and increased ionic conductivity, rate of charging performance, and ability to cycle and maintain charge at extreme temperatures.

These robust properties lend to the described SSPEs many uses and applications in various fields of electronics. Electrochemical devices, such as, fuel cells, such as LIBs or secondary batteries, green energy storage devices, clearly benefit from the described remarkable properties of these SSPEs. That is, these electrochemical devices, when incorporating the SSPEs described herein as the electrolyte, will be extremely useful in a much wider range of applications and conditions as compared with state-of-the-art devices comprising liquid electrolytes or GPEs. Such fuel cells are in some instances rechargeable fuel cells. Electrochemical devices therefore often possess two electrodes or electrode layers (anode and cathode) and an intervening electrolyte through which ion passes. The electrochemical devices herein utilize lithium ions as the electrically charged carrier. The electrochemical device is not particularly limited in size since its applications range from portable electronic devices, electrical vehicles, electrical airplanes, electrical drones, military grade equipment including sensors, radar, lasers, and other weapon-related technology such as rail guns, electric catapults, ship propulsion systems, back-up power plants, grid-scale energy storage devices, and the like. These uses, and many similar, are contemplated herein as end uses for electrochemical devices incorporating within them the described SSPEs.

The materials comprising the anode and cathode are not particularly limited. In some embodiments the anode is comprised of lithium metal. In other embodiments the anode is comprised or an alloy of lithium and another metal. For instance, in some embodiments the anode comprises one or more of Li, Na, Zn, Sn, Sb, Ag, Au, Fe, Cu, Mg, Nb, Mo, Pd, Cd, In, Bi, Al, Si, Ge, or an alloy thereof. In other embodiments, the anode comprises carbon material. In some embodiments the carbon material is graphite, hard carbon, soft carbon, graphene, and/or carbon nanotube. In some embodiments an insertion material is included. In such embodiments the insertion materials is lithium titanate.

In a non-limiting embodiment of the described electrochemical devices there is a cathode that is a layered transition metal oxide. In such embodiments, the layered transition metal oxide is in the form of $AMO_2$, where "A" stands for alkaline metal and "M" stands for transition metal. Exemplary non-limiting alkaline metals include lithium, sodium, and potassium. Exemplary non-limiting transition metals include Ni, Mn, Co, Cr, V, Fe, Mo, Cu, Zn, Ti, Al, W, Ta, Ru, and/or Ir. While technically some of these metals are not considered in the art to be "transition" metals, nonetheless these species are all known to function as required in a cathode setting within an electrochemical device. In another embodiment, the cathode is polyanionic olivine. In such embodiments, the polyanionic olivine is, for example in the form $LiMPO_4$, where "M" stands for Fe, Mn, Co, and/or Ni, alloys and combinations thereof. In another embodiment, the cathode is a conversion cathode comprised of metal fluoride. In such embodiments, the metal fluoride is, for example, represented as "MF" where "M" is a metal and "F" is fluoride. In such embodiments, the metal is one or more of Fe, Cu, Mg, Co, Ni, Mo, Mn, Nb, Zn, Ti, Si, Se, and/or P. In another embodiment, the conversion cathode is a metal sulfide with the formula MS, where "M" is as defined above and "S" is sulfur. In such embodiments, the metal is selected from one or more of Fe, Cu, Mg, Co, Ni, Mo, Mn, Nb, Zn, Ti, Si, Se, and P.

Further modifications and alternative embodiments of various aspects of the methods and systems described herein will be apparent to those skilled in the art in view of this description. Accordingly, this description is to be construed as illustrative only and is for the purpose of teaching those skilled in the art the general manner of carrying out the disclosed methods and systems. It is to be understood that the forms of the disclosed methods and systems shown and described herein are to be taken as examples of embodiments. Elements and materials may be substituted for those illustrated and described herein, parts and processes may be reversed, and certain features of the disclosed methods and systems are capable of being utilized independently, all as would be apparent to one skilled in the art after having the benefit of this description of the disclosed methods and systems. Changes may be made in the elements described herein without departing from the spirit and scope of the disclosed methods and systems as described in the following claims.

All of the references cited above, as well as all references cited herein, are incorporated herein by reference in their entireties. The following examples are offered by way of illustration and not by way of limitation.

EXAMPLES

Example 1: General

The semi-solid polymeric electrolytes (SSPE) described herein are generally, but not always, produced under inert atmosphere and low humidity condition (4.14% relative humidity) and at ambient temperature, or about 25 to 27° C.

All chemicals unless otherwise stated were obtained from Sigma-Aldrich, Inc. (St. Louis, Mo., US) and are generally of >99.9% purity/battery grade. Any other standard equipment should be listed here with model numbers and manufacturer (including city and state of manufacturer), if any. The electrochemical testing is conducted on Arbin, Neware, Princeton Applied Research, Gamry unless mentioned otherwise.

Example 2: Synthesis of LPP-FD Polymer Electrolyte (SSPE)

Described in this example is an embodiment of the SSPE described herein, called LPP-FD, made by dissolving an alkaline metal salt into a highly solvated ion conductive phase system, adding to the dissolved alkaline metal salt a fast cross-linking crosslinker and chemical initiator.

First, 1 M lithium salt, lithium bis(fluorosulfonyl)imide (LiFSI), was dissolved into 1,2-dimethoxyethane (DME) and 1,1,2,2-tetrafluoroethyl-2,2,3,3-tetrafluoropropyl ether (TTE) under stirring at 25° C. for 12 hours to form a homogeneous solution at a volume ratio of DME/TTE of 1:3. Other volume ratios between 2:1 and 1:3 were also tested and found to produce similar SSPE (data not shown).

To the dissolved lithium salt was added 2 wt % of bis[2-(methacryloyloxy)ethyl]phosphate (BMEP, also called P(bisMEP), crosslinker), followed by addition of 2,2'-azobis (2-methylpropionitrile) (AIBN, $(CH_3)_2C(CN)N=NC(CH3)_2CN$, initiator) under stirring at 25° C. for about 5 minutes to form the electrolyte precursor. The weight percent of initiator/crosslinker was 2%. It is noted that in this protocol, as long as the molar ratios of crosslinker to initiator observed, volume ratios of solvents is scaled lower or higher as needed.

The precursor was a semi-transparent non-viscous liquid. However, upon polymerization and curing, the cured polymer electrolyte exhibits neither liquid nor solid features but somewhere in between, that is, a semi-solid. This SSPE is abbreviated herein as LPP-FD, i.e., lithium poly(phosphonate) chelated with fluorinated and diglyme molecules.

Example 3: Synthesis of LPT-D Polymer Electrolyte (GPE)

Described in this example is production of a control gel electrolyte, called LPT-D, that is made by dissolving an alkaline metal salt into a solvent system, adding to the dissolved alkaline metal salt a fast cross-linking crosslinker and chemical initiator. This electrolyte is made to mimic standard gel electrolyte properties known in the art as a control or comparative example. (See, Cheng et al., *Adv. Energy Mat.*, 8:1702184 (2018), and Li et al., *Solid State Ionics*, 176:1903-1908, 2005).

An alkaline metal salt, 1 M lithium salt, lithium bis (fluorosulfonyl)imide (LiFSI), was dissolved into DME under stirring at 25° C. for about 12 hours to form a homogeneous solution.

To the dissolved alkaline metal salt was added 2 wt % of fast crosslinking crosslinker trimethylolpropane ethoxylate triacrylate ($[H_2C=CHCO_2(CH_2CH_2O)CH_2]_3CC_2H_5$, CAS No. 28961-43-5, also called ethoxylated trimethylolpropane triacrylate) followed by addition of chemical initiator AIBN under stirring at 25° C. for 5 minutes to form an electrolyte precursor. The weight percent of initiator to crosslinker was 2%.

This precursor is referred to herein as LPT-D and was a semi-transparent liquid having a low viscosity. The acronym LPT-D is meant to indicate lithium poly(trimethylolpropane ethoxylate triacrylate) chelated with diglyme molecules.

Example 4: Formation of Cell Stacks

To test the electrochemical capabilities of the SSPE in comparison to the GPE in the context of an electrochemical battery or device, the curable solutions prepared in Examples 2 and 3 were incorporated into a cell stack (either button-coin type or pouch-type) and then polymerization was initiated to form the SSPE for testing. Thus, in this example, the curable solutions of LPP-FD or LPT-D were dropped into a cell stack, sealed under vacuum, and then polymerized.

The cell stack starting materials, unless otherwise stated, were either made in-house or obtained from a battery material supplier (MSE Supplies, LLC, Tucson, Ariz., US).

About 40 μL of the curable solution was added to the compartment of the cell stack and sealed by crimping at ambient temperature under Argon. The sealed cell with curable solution was then cured at 40° C. for 10 minutes each, followed by cooling to 25° C. to obtain either the LPP-FD polymer electrolyte or the LPT-D polymer electrolyte.

These two cell stacks were then subjected to various testing as explained in more detail below. These coin cells are then used in later experiments for testing. However, in general, these need not be necessarily coin stacks. The following experiments could have just as well been performed with prismatic, cylindrical, or other cell types. The button or cell type and pouch type devices were selected simply for testing convenience.

Example 5: Evaporation Testing

As is known in the art, conventional liquid and gel systems are often prone to evaporation at high temperatures. This is due to high volatility of liquid component in the known systems. The goal of this example is to compare the volatility of the described SSPE systems with legacy liquid and gel systems. Thus, this experiment examines the hypothesis that the electrolyte's volatility can be controlled by creating a strong chelating environment for organic solvent molecules within the polymeric network. This is quantitated by measuring evaporation rates at normal operational temperatures.

In each experiment, 2 g each of the electrolytes created in Examples 2 (SSPE) and 3 (GPE) and a conventional liquid electrolyte of 1 M LiFSI in DME (control), were prepared and weighed into glass containers. The glass containers were then left open and exposed to an argon-filled glovebox (99.999% purity) having a water content of less than 0.5 ppm and an oxygen content of less than 0.5 ppm to mimic actual working conditions.

Weight loss of each SSPE system was detected every hour for the first 3 hours, and then again at a time point of 24 hours, at ambient temperature of 25° C.

Figure 3:
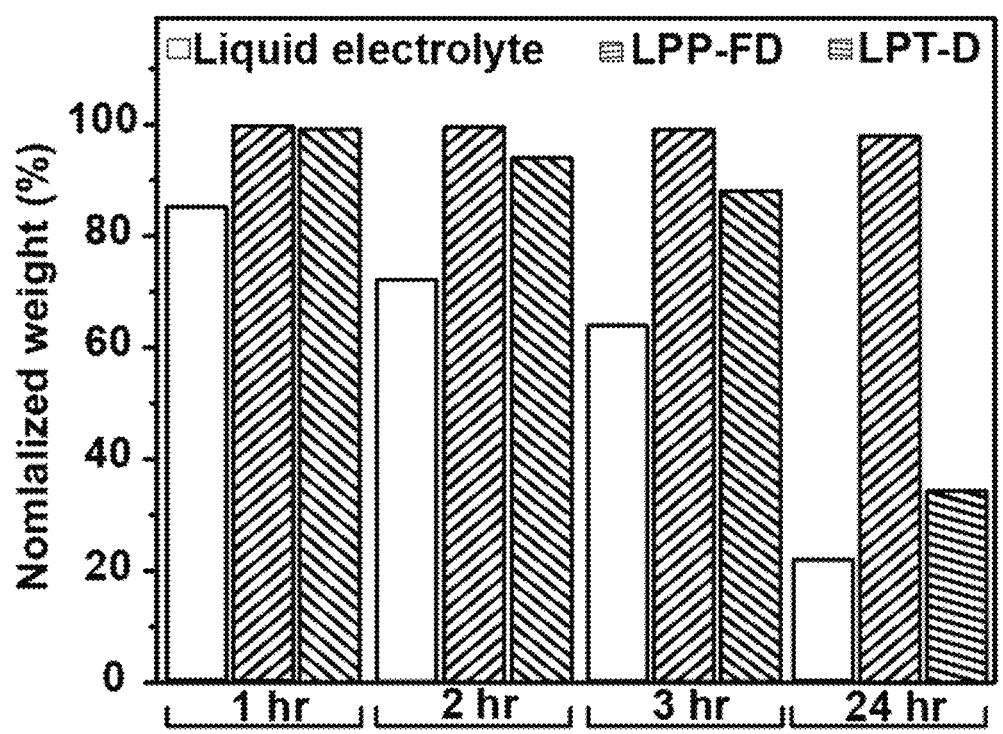

As shown in FIG. 3, both LPP-FD (upward horizontal hash marked bar) and LPT-D (downward horizontal hash marked bar) out-performed the standard liquid lithium-ion electrolyte (open bar). The difference in performance is marked especially at the 24 hour point wherein the standard liquid electrolyte lost as much as 85% of its weight due to evaporation, whereas LPP-FD only exhibited minimal weight loss. Thus, it is believed that by introducing an oxygen atom-rich polymer backbone as well as adjusting the molar ratio between cation and solvent, the weight loss is ~15% for LPT-D and only 1% for LPP-FD after 3 hours of evaporation at 25° C. In contrast, the liquid electrolyte loses ~40% of the initial weight. It is postulated that the highly intertwined polymer network also contributes to this stability by physically trapping the highly solvated ion conductive phase within the semi-solid polymer. This is evidenced by the extraordinary weight retention of LPP-FD, where greater than 98% of the weight is retained even after 24 hours exposure.

Example 6: Ionic Conductivity of the Electrolytes

In this example, the two representative electrolytes described in Examples 2 (SSPE) and 3 (GPE) were subjected to conductivity testing. To perform such testing the electrolytes are first formed/cured into thin disks, assembled into button or coin cells, and impedance was taken to measure conductivity.

Each electrolyte was cast into a self-standing thin film and punched into a 200 micron thick disk having 14 mm diameter. The films were then sandwiched by two stainless steel electrodes in a closed testing case as explained in further detail, below.

Electrochemical impedance was then measured using electrochemical testing station (Princeton Applied Research, Oak Ridge, Tenn., US) at 25° C. Ionic conductivity was calculated using the equation $\sigma = l/RA$, where $\sigma$ is the ionic conductivity, l is the thickness of the electrolyte film, R is the impedance, and A is the area of the film surface.

Figure 4:
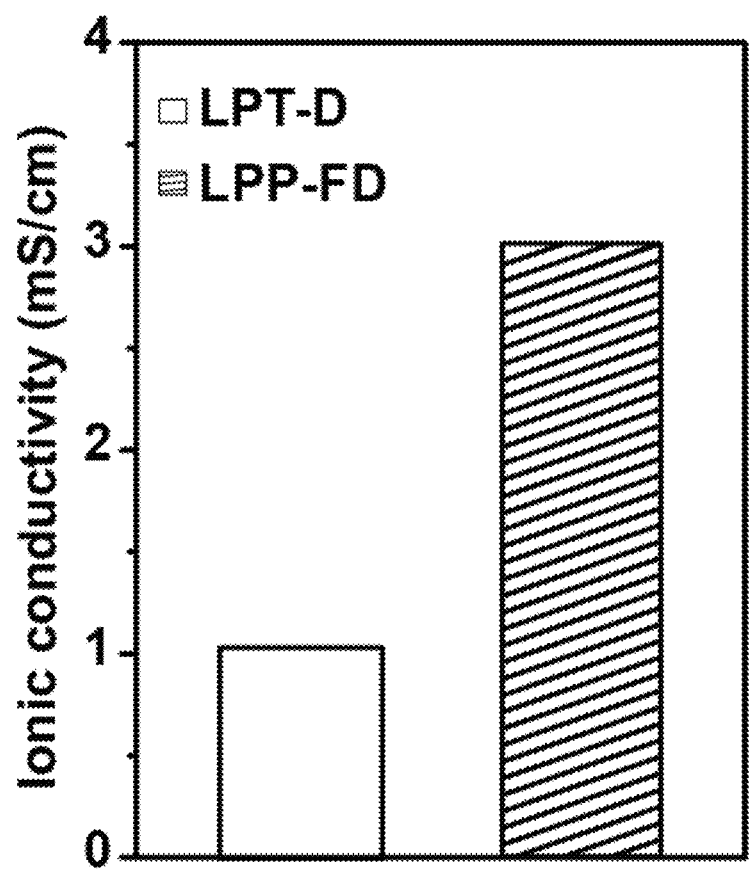
FIG. 4 shows a bar graph of ionic conductivity (mS/cm) for two exemplary electrolytes (LPP-FD and LPT-D). The graph shows that LPP-FD exhibits much higher ionic conductivity at 25° C.

The results are provided in FIG. 4, where it is seen that the LPT-D embodiment (open bar) exhibits an ionic conductivity of about 1 mS/cm and the LPP-FD embodiment (hash marked bar) exhibits a conductivity of about 3 mS/cm at 25° C. temperature. This compares favorably with reported values of similar gel-type electrolyte systems. Thus, by changing the polymer backbone as well as the organic solvent molecules, the LPP-FD exhibited 3-times higher ionic conductivity than LPT-D. This number is at least an order of 2 magnitude higher than the state-of-the-art poly (ethylene oxide)-based polymer electrolyte at 25° C. Additional testing was performed at −40° C. where the yield was 0.9 mS/cm for LPP-FD and 0.3 mS/cm for LPT-D (data not shown).

Example 7: Cycling Testing of Full Cell with SSPE

In this example, both embodiments from Examples 2 and 3 were examined for their ability to cycle. To perform this testing, the SSPEs were added to CR20320 type coin cells as described below.

To prepare the electrodes, a slurry of lithium nickel manganese (NMC) oxide powder with conductive carbon and a binder of polyvinylidene fluoride having a mass ratio of 9:0.5:0.5 was mixed using a planetary centrifugal mixer at 25° C. Temp and ambient atmosphere. This slurry was then cast into an aluminum foil current collector using a Doctor Blades Assembly (Tape Casting Warehouse, Inc., Morrisville, Pa., US). The electrodes were then baked at 90° C. for 1 hr and roll-pressed before overnight drying at 120° C. Anode and cathode are made in-house as separator and casing are purchased. (See, Murray et al., *J. Electrochem. Soc.*, 166:A329, 2019, and Marks et al., *J. Electrochem. Soc.*, 158:A51, 2010). Dried electrodes were then cut into disks having a diameter of 15 mm or a 40 cm$^2$ laminate.

Figure 5:
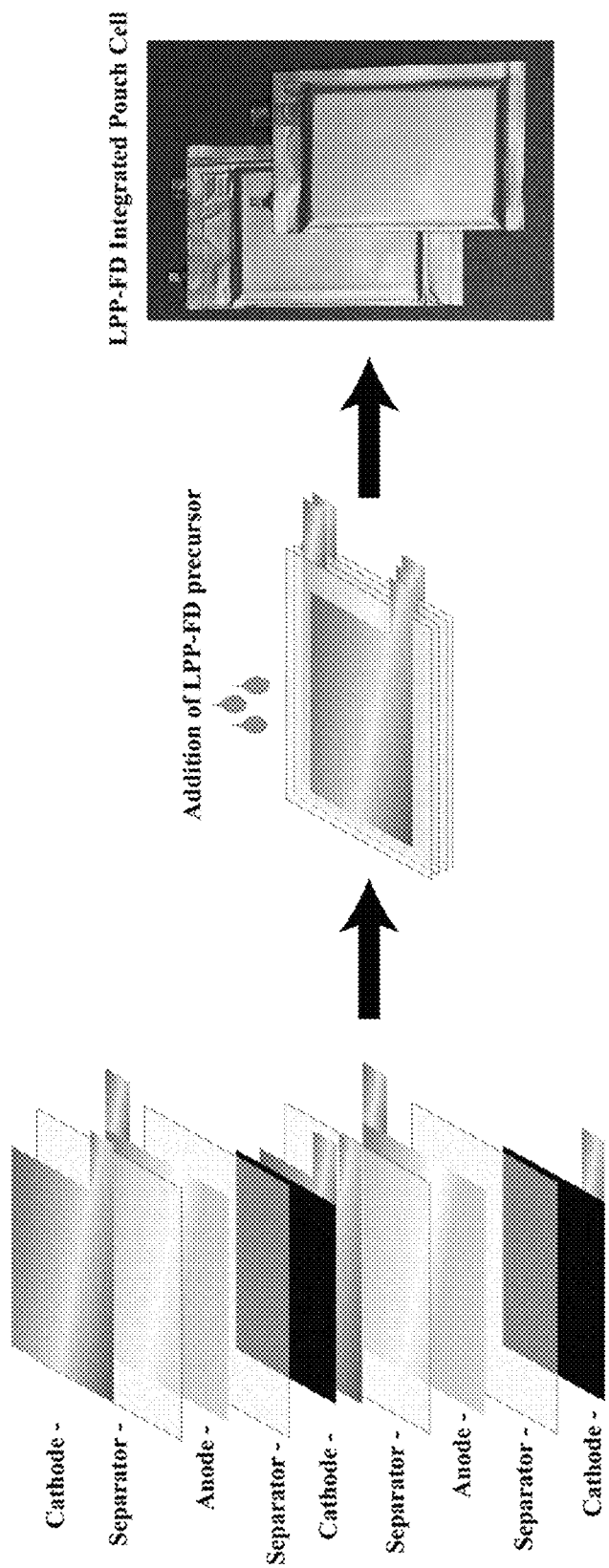
FIG. 5 is a schematic showing the standard process for assembly of a battery cell incorporating the described electrolyte according to the present disclosure in the form of a pouch cell. This process follows a standard process known in the art showing that the described electrolytes are integratable directly into established manufacturing processes.

For coin cell stacks, the anode is first added to the case, followed by addition of electrolyte including initiators, as described in Examples 2 and 3, via pipetting (about 20 µl), followed by a separator (porous, PE or PP), followed by addition of the cathode, then more electrolyte is added (about 20 µl, for a total of 40 µl). (See, FIG. 5). Then case top is added and the sides are crimped. The coin cell is then baked to initiate polymerization. For pouch-type stacks, an aluminum package is used that houses the stack. This pouch is then injected with electrolyte and sealed and then baked as with the coin cells.

CR20320 type coin cells or large format pouch cells (made in-house as described above), e.g., 5 mm by 8 mm, were assembled in an argon-filled glove box using a polyethylene (PE) separator, a lithium counter electrode, and about 40 µl (for coin cell) or 2 g/Ah (for pouch cells) electrolyte precursors described in Examples 2 and 3. (See illustration of pouch formation in FIG. 5). The completed cells were then rested in an Arbin cycler at 25° C. for 6 hr before electrochemical testing. (Arbin Instruments, College Station, Tex., US).

Cycling was then conducted with 3 formation cycles at 0.1 mA/cm$^2$ and continuous cycling at 3 mA/cm$^2$ between 2.7-4.2 V vs. Li$^+$/0.

The results of the cycling test are shown in FIG. 6. The closed circles represent data collected from the LPP-FD coin cell and the closed squares represent data obtained from the LPT-D coin cell. FIG. 6 shows the cycling stability of the two exemplary electrolytes in Li/NMC full cells (areal capacity 2 mAh/cm$^2$). As seen from the graph, the LPP-FD-based cell retains 80% of the original capacity over 2000 cycles at 1C discharge rate, while LPT-D barely delivers any capacity after 150 cycles. These results demonstrate that the LPP-FD is a superior electrolyte in maintaining a stable SEI on an Li-metal anode as well as being oxidatively stable against high voltage cathode during long-term operation.

Further, FIG. 7 shows the electrolyte loading effect on the long-term cycling stability of cells containing the LPP-FD electrolyte. As can be seen from the data presented, this experiment shows the good cycling performance of LPP-FD regardless of the cathode areal capacity. In conventional electrolytes (liquid or polymer), higher areal capacity usually leads to faster capacity fade due to thicker Li layer utilized per cycle, which accelerates the degradation of the Li-anode.

Example 8: Rate Testing of Full Cell with SSPE

In this example, both embodiments from Examples 2 and 3 were examined for their ability to cycle. To perform this testing, the SSPEs were added to CR20320 type coin cells as described below.

Coin cells were prepared as in Example 7, above. Rate tests were performed at current densities of 0.1, 0.2, 0.5, 1, 2, 5, 10, 20 mA/cm$^2$ between 2.7-4.2 V vs. Li+/0.

The results of the rate tests for both electrolyte substances are also shown in FIG. 7. The circles represent data collected from the LPT-D pouch and the triangles represent data obtained from the LPP-FD pouch. This result shows the rate capability of the two exemplary electrolytes in Li/NMC full cells (areal capacity 2 mAh/cm$^2$). It is believed that the high ionic conductivity and stable solid-electrolyte-interphase are critical to maintain cell capacity utilization at high power operation. In this experiment, the LPP-FD, thanks to its unique ion conduction mechanism, can retain >80% of the initial capacity even at an area current density of 10 mA/cm$^2$, corresponding to 5C discharge (12 minutes to fully discharged state. Note: 1C equals to fully discharge the battery in 1 hour). In comparison, the LPT-D delivers only 60% of the initial capacity at a low rate of 1 mA/cm$^2$, corresponding to 0.5C discharge (2 hours to fully discharged state).

Example 9: Low Temperature Cycling Stability of LPP-FD

Essentially the same experiment was performed as in Example 7 for the LPP-FD SSPE, except the experiment was performed at low temperatures to determine the low temperature cycling stability of LPP-FD at −20° C. and −40° C.

The data from this test are shown in FIG. 9, which shows the low temperature effect on cycling stability of cells made with the LPP-FD electrolyte. The data in FIG. 9 show the ultra-low temperature cycling stability of the LPP-FD polymer electrolyte. Even at −40° C., at which temperature most liquid electrolyte would freeze, the LPP-FD-based cell delivered over 40% of the capacity obtained at 25° C. No capacity fade was observed when the cell was operated at 0.5 mA/cm$^2$ (0.25C).

This outstanding low temperature performance is believed to be attributable to the unique solvation structure within the semi-solid region of the LPP-FD polymer electrolyte, where the chelated solvent molecules likely do not experience phase change at subzero temperature, and hence do not affect the cation transport.

Furthermore, the voltage profiles are extracted from FIG. 9 (low temperature cycling). The voltage profiles show similar charge discharge curves at different temperature (FIG. 11: 25° C., FIG. 12: −20° C., FIG. 13: −45° C.), indicating the cell functions normally at ultra-low temperature.

The extracted voltage profiles from FIGS. 9 and 10 of the LPP-FD cells operating from 25° C. to −40° C. are presented in FIGS. 11 to 13. The data presented in these Figures show that the cells functional normally at even ultra-low temperatures.

Example 10: High Temperature Cycling Stability of LPP-FD

Essentially the same experiment was performed as in Example 7 for the LPP-FD SSPE, except the experiment was performed at higher than ambient temperatures to determine the high temperature cycling stability of LPP-FD at 50° C. and 70° C.

The data from this test of the LPP-FD SSPE are shown in FIG. 10, which shows that the LPP-FD cell has a high temperature cycling stability. The cell exhibited stable cycling at 70° C. with a high current density 3 mA/cm$^2$ (1.5C), at which level most liquid or polymer electrolytes will undergo accelerated decomposition by reacting with the delithiated cathode in the charged state.

This exceptional high temperature performance of the LPP-FD electrolyte is believed to be related to the thermal stability of the LPP-FD SSPE which is resistant to oxidation at elevated temperatures.

Example 11: Self-Discharge Rate for LPP-FD SSPE Cells

In a further experiment aimed at characterizing the behavior of the SSPE described herein, it is of interest to also determine the "self-discharge" rate of the battery cell formed with the LPP-FD SSPE. Self-discharge rates of such batteries are often about 3% of capacity per month for industry-standard liquid lithium ion batteries. This test is designed to compare this rate with the SSPE described herein. These data, therefore, show the ability of the LPP-FD polymer electrolyte to hold an electrical charge over long periods of time (many days).

In this experiment, an LPP-FD cell similar to that described in Example 7 was prepared but in the format of a pouch instead of a coin cell. The pouch cell was then first fully charged to 4.2V and then held for one month (30 days), followed by a full discharge to evaluate any loss in capacity. The voltage profile data were obtained from the LPP-FD electrolyte pouch cell operated for 30 days at a voltage of 4.2V.

The data obtained from this experiment are shown in FIG. 14. Typical Li-ion batteries lose 3% of the capacity per month at a fully charged state. (See, Johnson et al., *J. Power Sources*, 70.1 (1998): 48-54). In contrast, the LPP-FD SSPE cell exhibited excellent self-discharge performance, with negligible capacity fade, which likely reflects the stable interphase generated at cathode and anode surfaces.

Example 12: Voltage Hold Area-Specific Resistance Rise

This experiment is designed to compare the oxidative stability of the two polymer electrolytes at a fully charged state by investigating the change in area-specific resistance over a period of two months. Any rise in the resistance is an indication of side reactions at high charge potential (4.2V), including corrosion of the current collector and surface reactions of the NMC cathode.

Pouch cells were first prepared as already described above for each of the electrolytes. The cells underwent formation cycles, then were charged to the upper-cutoff voltage (4.2V). The cells then rested for 24 h at open-circuit, with daily 30 second charge and discharge pulses and trickle-charged to maintain voltage. The cells' voltage response during daily current pulses were used to calculate changes in cell resistance over time. Any rise in resistance was attributed to decomposition reactions that would eventually affect the cell's cycling capacity by increasing polarization.

The data obtained from this experiment are reflected in FIG. 15, which shows the area-specific resistance rise data (Ω/cm$^2$) during voltage hold at 4.2V for the two exemplary polymer electrolytes described herein. Clearly, the exemplary LPP-FD electrolyte exhibited excellent stability with negligible cell resistance rise over 60 days at 4.2V.

Example 13: Nail Penetration Test of Full Cell with SSPE

This test of the full pouch cells was performed to demonstrate the safety of the described SSPE in a fully charged pouch cell at 4.2V. In many cases with conventional liquid or polymer electrolytes, the pouch cell's voltage would drop to zero upon puncture, indicative of a short-circuit provided by the conductive nail.

In this experiment, the pouch cell was held in place by a plastic frame while a stainless-steel nail head was used to puncture the pouch followed by its removal after 30 seconds. A multimeter was used to monitor the cell's voltage throughout the test.

Surprisingly, the potential only drops by several hundred millivolts and returns to as high as 4.0V after the nail was removed, indicating that the SSPE cells do not sustain sufficient damage to permanently short-circuit, and that the cells do not discharge their full capacity as a result of the nail penetration. In fact, several cells were even able to maintain their full cell potential while the nail was inserted into the pouch (data not shown), indicating that the described semi-solid electrolytes were able to prevent a short-circuit altogether. Most importantly, in no trials were significant cell leakage or signs of exothermic reaction observed. This observation places the cells containing the described SSPEs at a Hazard Level 2 designation according to European Council for Automotive R&D (EUCAR) categorization.

Shown in FIG. 16 is the voltage profile of the LPP-FD cell as it is punctured by the nail in this experiment. The voltage profile shows that the voltage drops during initial nail penetration when the cell is at a fully charged state of 4.2V. Surprisingly, the cell was still functional and could be discharged even after nail removal. These data evidence the excellent safety properties of the pouch cell containing the LPP-FD polymer electrolyte described herein.

Example 14: Flammability Testing

To examine the degree of flammability of the exemplary embodiments of SSPE from Examples 2 and 3, each was tested for flammability and compared to industry standards as explained below.

A conventional liquid electrolyte of 1M LiFSI in DME, along with each of the semi-solid polymer electrolytes from Examples 2 and 3 were torched by a butane lighter. (See, FIG. 17).

The liquid electrolyte, as a baseline, was very flammable when ignited with a butane-based lighter, and the fire sustained until the electrolyte is completely consumed. The LPT-D (Example 2) exhibited a similar phenomenon as the liquid electrolyte, except that the semi-solid polymer was not flowable while burning. The LPP-FD (Example 3) electrolyte was completely inflammable even when torched with sustained fire. Only burn marks with charcoal color were observed on the LPP-FD polymer surface, which is an indication of the formation of a protective film from polymer decomposition. The conventional electrolyte burned immediately upon contact with the flame, but the two SSPE samples did not show any signs of ignition even under sustained fire for 10 minutes.

This experiment shows the importance of compositional and structural controls of the polymer electrolyte in order to achieve high degree of thermal stability and hence safety for battery operation.

The breadth and scope of the present disclosure should not be limited by any of the above-described exemplary embodiments, but should be defined only in accordance with the following claims and their equivalents. That is, the above examples are included to demonstrate various exemplary embodiments of the described methods and systems. It will be appreciated by those of skill in the art that the techniques disclosed in the examples represent techniques discovered by the inventor to function well in the practice of the described methods and systems, and thus can be considered to constitute optional or exemplary modes for its practice. However, those of skill in the art will, in light of the present disclosure, appreciate that many changes can be made in these specific embodiments that are disclosed and still obtain a like or similar result without departing from the spirit and scope of the described methods and systems.

What is claimed is:

1. A semi-solid polymer electrolyte, comprising:
a polymer,
a lithium salt,
a first solvent, and
a second solvent,
wherein the polymer is prepared by polymerization of one or more monomers, and wherein the one or more monomers are selected from: bis[2-(methacryloyloxy)ethyl] phosphate, bis(acryloyloxy)ethyl phosphate, bis(vinylcarbonyloxy)ethyl phosphate, and bis[2-(methylvinylcarbonyloxy)ethyl phosphate,
wherein the lithium salt is selected from any one or more of lithium bis(fluorosulfonyl)imide, lithium bis(trifluoromethylsulfonyl)imide, lithium bis(oxalato)borate, lithium hexafluorophosphate, lithium hexafluoroarsenate, lithium bis(trifluoromethane) sulfonimide, lithium trifluoromethanesulfonate, lithium perchlorate, lithium difluoro oxalato borate anion, lithium iodide, lithium bromide, lithium chloride, lithium hydroxide, lithium nitrate, and lithium sulfate,
wherein the first solvent is any one or more of 1,2-dimethoxyethane, dimethyl carbonate, 1,3-dioxolane, ethyl methyl carbonate, diethyl carbonate, dimethyl sulfoxide, ethyl vinyl sulfone, tetramethylene sulfone, ethyl methyl sulfone, ethylene carbonate, vinylene carbonate, fluoroethylene carbonate, 4-vinyl-1,3-dioxolan-2-one, dimethyl sulfone, methyl butyrate, ethyl propionate, trimethyl phosphate, triethyl phosphate, gamma-butyrolactone, 4-methylene-1,3-dioxolan-2-one, methylene ethylene carbonate, 4,5-dimethylene-1,3-dioxolan-2-one, allyl ether, triallyl amine, triallyl cyanurate, triallyl isocyanurate, and water,
wherein the second solvent is any one or more carbonate, fluoroether, and/or fluorobutane solvents, and
wherein the volume ratio of the first solvent to the second solvent is from 10:1 to 1:3.

2. The semi-solid polymer electrolyte of claim 1, wherein the monomer is bis[2-(methacryloyloxy)ethyl] phosphate.

3. The semi-solid polymer electrolyte of claim 1, wherein the monomer is any one or more of bis(acryloyloxy)ethyl phosphate, bis(vinylcarbonyloxy)ethyl phosphate, and bis[2-(methylvinylcarbonyloxy)ethyl phosphate.

4. The semi-solid polymer electrolyte of claim 1, wherein: the lithium salt is lithium bis(fluorosulfonyl)imide, the first solvent is 1,2-dimethoxyethane, and the second solvent is any one or more of 1,1,2,2-tetrafluoroethyl-2,2,3,3-tetrafluoropropyl ether, and tris(2,2,2-trifluoroethyl)orthoformate.

5. The semi-solid polymer electrolyte of claim 1, wherein the semi-solid polymer electrolyte possesses an ionic conductivity of between 0.1 mS/cm and 0.9 mS/cm at −40° C.

6. The semi-solid polymer electrolyte of claim 1, wherein the semi-solid polymer electrolyte possesses an ionic conductivity of between 0.5 mS/cm and 3.0 mS/cm at 25° C.

7. An electrochemical device, which comprises:
a first electrode,
a second electrode differing from the first electrode in polarity, and
the semi-solid polymer electrolyte of claim 1.

8. The electrochemical device of claim 7, wherein the device is cylindrical, prismatic, coin or button-shaped, or flat or pouch-shaped, wherein the first electrode is a metal anode, and wherein the second electrode is a layered metal oxide cathode.

9. The electrochemical device of claim 7, wherein the electrochemical device is a rechargeable lithium metal battery.

10. The electrochemical device of claim 9, wherein the rechargeable lithium metal battery holds charge and cycles at temperatures of from −40° C. to 70° C.

11. A semi-solid polymer electrolyte, which is produced by the process of:
dissolving a lithium salt into a first solvent and a second solvent, wherein the volume ratio of the first solvent to second solvent is 10:1 to 1:3,
adding to the dissolved lithium salt a cross-linker and a chemical initiator,
stirring for 0.5 to 24 hours at between 0° C. and 50° C. to provide electrolyte precursor, and
curing the electrolyte precursor,
wherein the first solvent is one or more of 1,2-dimethoxyethane, dimethyl carbonate, 1,3-dioxolane, ethyl methyl carbonate, diethyl carbonate, dimethyl sulfoxide, ethyl vinyl sulfone, tetramethylene sulfone, ethyl methyl sulfone, ethylene carbonate, vinylene carbonate, fluoroethylene carbonate, 4-vinyl-1,3-dioxolan-2-one, dimethyl sulfone, methyl butyrate, ethyl propionate, trimethyl phosphate, triethyl phosphate, gamma-butyrolactone, 4-methylene-1,3-dioxolan-2-one, methylene ethylene carbonate, 4,5-dimethylene-1,3-dioxolan-2-one, allyl ether, triallyl amine, triallyl cyanurate, triallyl isocyanurate, and water,
wherein the second solvent is any one or more carbonate, fluoroether, and/or fluorobutane solvents,
wherein the monomer is any one or more of bis[2-(methacryloyloxy)ethyl] phosphate, bis(acryloyloxy) ethyl phosphate, and bis(vinylcarbonyloxy)ethyl phosphate, bis[2-(methylvinylcarbonyloxy)ethyl phosphate,
wherein the lithium salt is any one or more of lithium bis(fluorosulfonyl)imide, lithium bis(trifluoromethylsulfonyl)imide, lithium bis(oxalato)borate, lithium hexafluorophosphate, lithium hexafluoroarsenate, lithium bis(trifluoromethane) sulfonimide, lithium trifluoromethanesulfonate, lithium perchlorate, lithium difluoro oxalato borate anion, lithium iodide, lithium bromide, lithium chloride, lithium hydroxide, lithium nitrate, and lithium sulfate, and
wherein the chemical initiator is an azo-initiator or a peroxide initiator.

12. The process of claim 11, wherein the first solvent is 1,2-dimethoxyethane.

13. The process of claim 11, wherein 2 to 15 wt % of the monomer is added to the dissolved lithium salt, and wherein 0.5 to 5.0 wt % chemical initiator is added to the dissolved lithium salt.

14. The process of claim 11, wherein the lithium salt is lithium bis(fluorosulfonyl)imide.

15. The process of claim 11, wherein the molar ratio of the first solvent to the second solvent is between 0 and 1, and wherein the volume ratio of the first solvent to the second solvent is from 10:1 to 1:3.

16. The process of claim 11, wherein the volume ratio of the alkaline metal salt to the first and second solvent combined is from 0.01 to 2.

17. The process of claim 11, wherein the chemical initiator is any one or more of 2,2'-azobis(4-methoxy-2,4-dimethylvaleronitrile), 2,2'-azobis(2,4-dimethylvaleronitrile), 2,2'-azobis (2-methylbutyronitrile), 1,1'-azobis(cyclohexane-1-carbonitrile), 4,4'-azobis(4-cyanovaleric acid), dimethyl 2,2'-azobis(2-methylpropionate), 2,2'-azobis[2-methyl-N-(2-hydroxyethyl)propionamide], 2,2'-azobis (isobutyroic acid amidine)dihydrochloride, benzoyl peroxide, tert-butyl peroxybenzoate, tert-butylperoxy isopropyl carbonate cumene hydroperoxide, cyclohexanone peroxide, 2,4-pentanedione peroxide, lauroyl peroxide, and tert-butyl peroxide.

18. The semi-solid polymer electrolyte of claim 1, wherein the polymer has a solvation structure or system of polymer-cation-anion-solvent-polymer, or polymer-cation-anion-cation-solvent-polymer.

19. The semi-solid polymer electrolyte of claim 18, wherein the solvation structure excludes free unbound solvent molecules.

20. The semi-solid polymer electrolyte of claim 1, wherein the molar ratio of the first solvent to the second solvent is between 0 and 1, and wherein the volume ratio of the alkaline metal salt to the first and second solvent combined is from 0.01 to 2.

21. The semi-solid polymer electrolyte of claim 1, wherein:
the monomer is bis[2-(methacryloyloxy)ethyl]phosphate,
the lithium salt is lithium bis(fluorosulfonyl)imide, and
the first solvent is 1,2-dimethoxyethane and the second solvent is 1,1,2,2-tetrafluoroethyl-2,2,3,3-tetrafluoropropyl.

* * * * *

UNITED STATES PATENT AND TRADEMARK OFFICE
CERTIFICATE OF CORRECTION

| | | |
|---|---|---|
| PATENT NO. | : 11,302,961 B1 | Page 1 of 1 |
| APPLICATION NO. | : 17/364422 | |
| DATED | : April 12, 2022 | |
| INVENTOR(S) | : Junhua Song et al. | |

It is certified that error appears in the above-identified patent and that said Letters Patent is hereby corrected as shown below:

In the Specification

After Column 1, Line 4, please insert the following:
-- GOVERNMENT LICENSE RIGHTS
This invention was made with Government support under contract number N6833518C0293 awarded by the Department of the Navy. The Government has certain rights in the invention. --

Signed and Sealed this
Sixteenth Day of December, 2025

John A. Squires
*Director of the United States Patent and Trademark Office*